(12) United States Patent
Keehr et al.

(10) Patent No.: US 8,971,834 B2
(45) Date of Patent: Mar. 3, 2015

(54) DIGITAL AND ANALOG IM3 PRODUCT COMPENSATION CIRCUITS FOR AN RF RECEIVER

(75) Inventors: Edward Keehr, Pasadena, CA (US); Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1110 days.

(21) Appl. No.: 12/952,237

(22) Filed: Nov. 23, 2010

(65) Prior Publication Data

US 2011/0110473 A1 May 12, 2011

Related U.S. Application Data

(63) Continuation of application No. 11/751,363, filed on May 21, 2007, now Pat. No. 7,894,788.

(60) Provisional application No. 60/801,740, filed on May 19, 2006, provisional application No. 60/938,937, filed on May 18, 2007.

(51) Int. Cl.
*H04B 1/10* (2006.01)

(52) U.S. Cl.
CPC .................................. *H04B 1/1018* (2013.01)
USPC ........................................ 455/296; 455/307

(58) Field of Classification Search
CPC ............... H04B 1/0475; H04B 1/1018; H04B 2001/0491; H04B 2001/0433; H04B 2001/0425; H04B 2001/0441; H04B 7/2621; H04B 1/123; H04B 1/30; H04B 1/1027; H04B 1/18; H04N 5/44; H04L 27/368; H04L 27/2071; H04L 5/02; H04L 27/367; H04L 27/12; H04L 27/2096; H04L 27/2636; H04L 27/36; H04L 27/366; H03H 7/0115
USPC ........................... 455/130–355; 375/350–370
See application file for complete search history.

(56) References Cited

U.S. PATENT DOCUMENTS 5,237,332 A 8/1993 Estrick et al.
5,507,036 A * 4/1996 Vagher .......................... 455/295
(Continued)

FOREIGN PATENT DOCUMENTS

EP PCT/US2007/069377 1/2008

OTHER PUBLICATIONS

Faulkner, DC Offset and 1M2 Removal in Diect Conversion Receivers, IEE Proc. Communication, vol. 149, No. 3, Jun. 2002, pp. 179-184.
(Continued)

*Primary Examiner* — Lana N Le
(74) *Attorney, Agent, or Firm* — Milstein Zhang & Wu LLC; Joseph B. Milstein

(57) ABSTRACT

Third-order intermodulation products (IM3) are attenuated in RF receivers by providing a typical main signal path and a parallel auxiliary signal path in which the IM3 products are accentuated, and the output from the main signal path is adaptively filtered to attenuate the IM3 products. In one embodiment, a multirate filter bank (MRFB) with asymmetric analysis and synthesis sections is used to detect and isolate the IM3 products. In another embodiment an analog nonlinear term generator is placed at the front of the auxiliary signal path. The analog nonlinear term generator takes advantage of the nonlinearities of a differential MOSFET circuit and a multiplier to extract the IM3 products in the RF input signal. The outputs of the main signal path and the auxiliary signal path are inputs to a complex least mean squares filter to attenuate the IM3 products in the resulting signal.

9 Claims, 11 Drawing Sheets

(56) References Cited

U.S. PATENT DOCUMENTS

| | | | |
|---|---|---|---|
| 5,872,446 | A | 2/1999 | Cranford, Jr. et al. |
| 6,078,614 | A | 6/2000 | Brown et al. |
| 6,104,442 | A | 8/2000 | Patel et al. |
| 6,219,376 | B1 | 4/2001 | Zhodzishsky et al. |
| 6,236,263 | B1 | 5/2001 | Iwamatsu |
| 6,434,375 | B1 | 8/2002 | Chulajata et al. |
| 6,785,529 | B2 | 8/2004 | Ciccarelli et al. |
| 7,072,465 | B1 | 7/2006 | Benesty et al. |
| 7,599,421 | B2 | 10/2009 | Sorrells et al. |
| 8,086,207 | B2 * | 12/2011 | Muthali et al. ............... 455/323 |
| 8,290,449 | B2 * | 10/2012 | Keehr et al. ............... 455/114.1 |
| 8,588,332 | B2 * | 11/2013 | Cai et al. ..................... 375/296 |
| 8,619,906 | B2 * | 12/2013 | Bai .............................. 375/297 |
| 2003/0184373 | A1 | 10/2003 | Cameron et al. |
| 2004/0038656 | A1 | 2/2004 | McCall et al. |
| 2005/0173767 | A1 | 8/2005 | Hirabayashi et al. |
| 2006/0093024 | A1 | 5/2006 | Pietraski et al. |
| 2007/0010224 | A1 * | 1/2007 | Shi .............................. 455/226.2 |
| 2008/0039045 | A1 | 2/2008 | Filipovic et al. |
| 2009/0086863 | A1 | 4/2009 | Komninakis et al. |
| 2010/0266067 | A1 * | 10/2010 | Eitel ............................ 375/324 |

OTHER PUBLICATIONS

Hassibi et al, H Optimality of the LMS Algorithm. IEEE Transactions on Signal Processing, vol. 44, No. 2, Feb. 1996, pp. 267-280.

Kim et al, Highly Linear Receiver Front-End Adopting MOSFET Transconductance Linearization by Multiple Gated Transistors, IEEE JSSC, vol. 39, No. 1, Jan. 2004, pp. 223-229.

Nagata, Linear Amplification Technique for Digital Mobile Communications, NEC Corporation, Kawasaki-City, Japan, 1989.

Hassibi et al, Linear Estimation in Krein Spaces. I. Theory. Automatic Control IEEE Transactions vol. 41, Issue 1, Jan. 1996, pp. 18-33.

Hassibi et al, Linear Estimation in Krein Spaces. II. Applications, Automatic Control, IEEE Transactions, vol. 41, Issue 1, Jan. 1996, pp. 34-49.

Aparin et al, Modified Derivative Superposition Method for Linearizing FET Low Noise Amplifiers, 2004 IEEE RFIC Symposium, San Diego, Ca, Aug. 4, 2004 pp. 105-108.

Vaidyanathan, Multirate Systems and Filter Banks, Prentice-Hall, Englewood Cliffs, NJ, 1993.

Jubien et al, Noise Sensing USing a Variation of the nLMS Adaptive Filter with Auto Calibration, Mackie Industrial White Paper Sep. 2000, pp. 1-12.

Kub et al, Programmable Analog Vector-Matrix Multipliers, IEEE Journal of Solid-State Circuits, vol. 25, No. 1, Feb. 1990, pp. 207-214.

Shahed Hagh Ghadam et al, Adaptive Compensation of Nonlinear Distortion in Multicarrier Direct-Conversion Receivers, Tampere University of Technology, Tampere, Finland p. 35-3, 2004.

Haykin, Adaptive Filter Theory, Prentice Hall, 2002, p. 240-301, Upper Saddle River, NJ.

Saleh et al, Adaptive linearization of Power Amplifiers in Digital Radio Systems, The Bell System Technical Journal vol. 62, No. 4, Apr. 1983 p. 1019-1033, Apr. 1983.

Faulkner et al, Adaptive linearization Using Predistortion—Experimental Results, Transactions on Vehicular Technology, vol. 43, No. 2, May 1994 p. 323-332.

Valkama et al, Advanced Dig. Sig. Proc. Tech. for Compensation of Nonlinear Distortion in Wideband Multicarrier Radio Rec., IEEE Trans Micro Theory . . . Jun. 2006 pp. 2356-2365.

Kub et al, Analog CMOS Implementation of High Frequency Least-Mean Square Error Learning Circuit, IEE Journal of Solid-State Circuits. vol. 30, No. 12, Dec. 1995 pp. 1391-1398.

Aparin et al, An Integrated LMS Adaptive Filter of TX Leakage for COMA Receiver Front Ends, IEEE Journal of Solid-State Circuits, vol. 41, No. 5, May 2006, pp. 1171-1182.

Van Der Heijden et al, A Novel Frequency-Independent Third-Order Intermodulation Distortion Cancellation Tehnique for BJT Amplifiers. IEEE JSSC, Sep. 2002 pp. 1176-1183.

Shearer, A Precision CMOS Analog Cubing Circuit, Circuits and Systems. 2004. NEWCAS 2004. The 2nd Annual IEEE Northeast Workshop on Jun. 20-23, 2004 pp. 281-284.

* cited by examiner

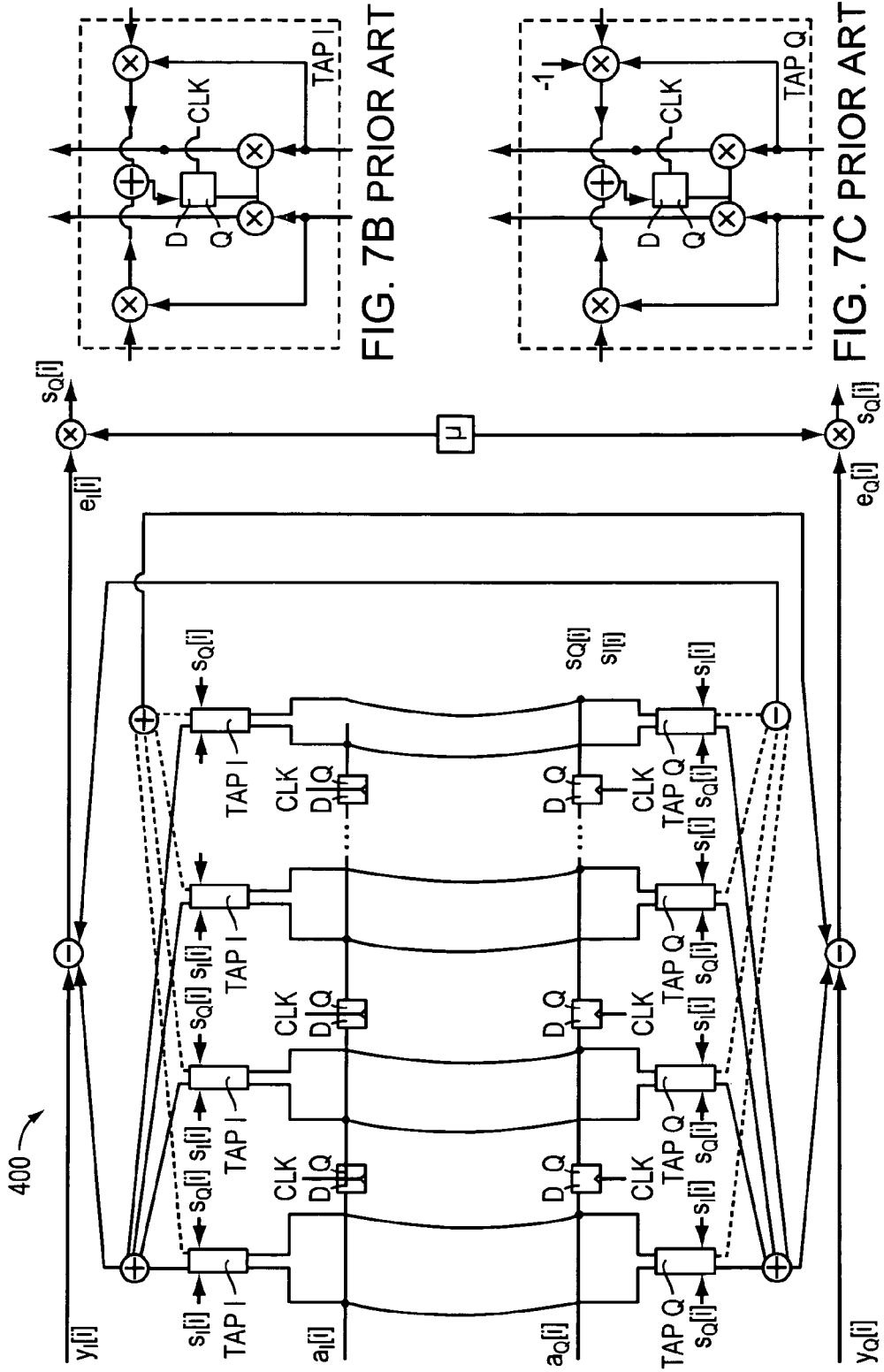

DIGITAL AND ANALOG IM3 PRODUCT COMPENSATION CIRCUITS FOR AN RF RECEIVER

CROSS-REFERENCE TO RELATED APPLICATIONS

This application is a continuation of U.S. patent application Ser. No. 11/751,363 filed May 21, 2007 now U.S. Pat No. 7,894,788, which application claims the benefit of U.S. Provisional Patent Application Ser. No. 60/801,740, filed on May 19, 2006, and also claims the benefit of U.S. Provisional Patent Application Ser. No. 60/938,937, filed on May 18, 2007. All of the applications enumerated above are incorporated herein by reference in their entirety.

FIELD OF THE INVENTION

This invention relates to RF receivers, and more particularly, to RF receivers with circuits to compensate for generated IM3 products.

BACKGROUND OF THE INVENTION

Radio-frequency (RF) receiver circuit architectures are typically designed to convert radiated signals at very high frequencies (typically referred to as radio frequencies) to baseband signals centered around zero frequency from which digital information may be extracted. These architectures typically interface to an antenna, which converts the radiated signal into a current or voltage, which is then processed by the RF receiver circuitry such that it is of the form (proper signal amplitude, center frequency, and bandwidth) that may interface to an analog-to-digital converter (ADC), which converts the processed analog signal into a form that may be further manipulated by digital circuit blocks such as microprocessors.

Typically, the RF receiver is only interested in extracting signal content from a much smaller frequency range than is acquired by the antenna. In order to avoid overloading the analog-to-digital converter at the terminus of the RF receiver, the undesired frequency bands must be filtered out. The cost of a filter in general is proportional to the product of the filter selectivity and the filter center frequency. Thus, completely removing the signals from the unwanted frequency range in the first few stages of the RF receiver, where the signal center frequency is quite high, is infeasible. Typically, one or more expensive off-chip filters are used to partially attenuate the undesired frequency bands within the first few blocks of the RF receiver. After sufficient gain is achieved in the desired signal band to surmount the noise introduced by later stages, a mixer is employed in order to perform a linear frequency translation of the desired signal to a lower frequency such that low cost, high selectivity filtering can be performed monolithically with the rest of the circuit.

These signals in the unwanted frequency range typically interact with nonlinearities within the RF circuitry and may produce undesirable signal products within the desired signal band. The undesirable signal products in question typically arise from the third-order terms in the circuit nonlinearities and are hence called in the literature third-order intermodulation products, or IM3 products for short. These interactions would typically occur in the first few blocks of the RF receive chain, prior to the bulk of selective filtering in the system. If either the costly filters mentioned above were removed to reduce component count or the block nonlinearities were reduced in order to save power or area, the undesirable signal products can have the effect of disabling the operation of the complete RF receiver system.

There exists a significant economic incentive to reduce the external component count, power, and area of RF receivers. If an efficient way to improve the linearity of an RF receiver could be devised, its power and area could be reduced while still retaining an acceptable possibility of system failure. If the linearity of an RF receiver were improved further to the point where certain thresholds were met, the off-chip filters could also be removed with an acceptable possibility of system failure.

Given that nonlinear transfer functions are inherently associated with the amplification components of contemporary RF receivers, one way to improve the nonlinearity of the system while only adding a minimal power burden is to provide accurate cancellation of the generated IM3 products.

The amplitude of the IM3 products of a receiver typically increases as the cube of the amplitude of the input signal to the receiver. The input amplitude at which the desired output amplitude and the rms amplitude of the IM3 products are equal (this is typically an extrapolated value) is referred to as the input-intercept-3 point (IIP3) and is a common measure of both receiver and receiver block linearity.

The most well known technique to improve the IIP3 of a given block in the RF receiver (such as the LNA or mixer) is to use emitter or source degeneration in the transconductance amplifiers in order to shift some of the transconductance burden from a nonlinear semiconductor junction to an inherently linear passive component, such as a resistor or an inductor. The use of a resistor for degeneration purposes, however, increases the noise contributed by the block. Typically the desired signal amplitude is small and any additional noise contributions can easily bury the desired signal.

This issue can be avoided by degenerating the transconductance amplifier with an inductor; however, this solution requires a large amount of area and is frequency-selective, that is, it would be unsuitable for emerging wideband communication systems such as orthogonal frequency-division multiplexing (OFDM). Furthermore, the level of improvement obtained is limited and has the effect of reducing the gain and other desirable properties of the amplifier.

In van der Heijden, M. P. et al., "A Novel Frequency-Independent Third-Order Intermodulation Distortion Cancellation Technique for BJT Amplifiers," *Solid-State Circuits Conference, IEEE Journal of*, Volume 37, Issue 9, September 2002 Page(s):1176-1183, a Volterra-series analysis is performed on a BJT common-emitter amplifier. This paper brings up the point that in order to completely cancel IM3 products in a typical single-ended BJT common-emitter amplifier, unacceptable conditions must be imposed on the input and output loading on the amplifier from a noise and power match perspective.

A differential BJT common-emitter amplifier with more degrees of freedom is introduced and analyzed in the paper using the same Volterra series analysis. It is found that under certain assumptions, IM3 product cancellation can be achieved while maintaining optimal input and output loading on the amplifier.

In general, bias-point specific compensation techniques such as these are sensitive to process, supply voltage, and temperature when implemented monolithically on a silicon die. For this technique to work optimally, an external monitoring and bias adjustment circuit would be required. Also, measurements of the actual circuit reported in this paper show a 30 dB reduction in peak IIP3 from the idealized circuit in simulation, suggesting that the cancellation technique is not robust in practice.

Furthermore, the differential nature of this amplifier is problematic in that it requires two on-chip center-tapped transformers for a monolithic implementation. In practice, this technique is area-intensive and would seldom be incorporated in a commercial integrated circuit.

In Aparin, V. et al., "Modified Derivative Superposition Method For Linearizing FET Low Noise Amplifiers," *Radio Frequency Integrated Circuits (RFIC) Symposium, 2004. Digest of Papers.* 2004 IEEE, 6-8 June 2004 Page(s):105-108 (Aparin et al. I) and Tae Wook Kim et al., "Highly Linear Receiver Front-End Adopting MOSFET Transconductance Linearization By Multiple Gated Transistors," *Solid-State Circuits Conference, IEEE Journal of,* Volume 39, Issue 1, January 2004 Page(s):223-229, a derivative superposition technique is used to linearize the low noise amplifier (LNA) and the LNA and mixer, respectively, in an RF receive chain. Both references implement this technique in an economically competitive CMOS process as opposed to a relatively expensive BJT process.

This technique relies on the fact that the coefficient of the 3rd-order term in the Taylor series expansion for the transconductance of a MOS common-source amplifier is bias-dependent. Thus, two MOS common source amplifiers biased at different operating points can be placed in parallel, one main amplifier biased at the optimal bias point for gain and noise purposes, and one auxiliary amplifier biased at the proper bias point to generate IM3 terms at the same amplitude but opposite polarity as the main amplifier.

This technique is power-efficient since the desirable bias point for the auxiliary amplifier is such that it is in weak inversion; that is, it dissipates negligible quiescent current.

Aparin, V. et al. I and Tae Wook Kim et al. describe additional modifications of this technique to improve performance in the presence of harmonic feedback, an effect originally discounted during the inception of this technique.

In addition, Tae Wook Kim et al. show that with proper biasing, the best-case IIP3 drops by only about 4 dBm in the case of the LNA, showing that the performance does not change drastically with reasonable changes in process, voltage, and temperature.

However, because this technique depends on the gate biasing of the circuit, the beneficial effects of this technique will break down for large input voltage swings, which is especially a problem at the mixer. This is supported in the paper by Tae Wook Kim et al., where the IIP3 curve is not a straight line.

In some designs, such as by Tae Wook Kim et al., the auxiliary transistor has been designed to be a similar size as the main transistor. In the event of a large signal swing, both transistors will conduct heavily, leading to increased large-signal current for a large input signal. This reduces the compression point (ICP1) of the circuit and hence increases its susceptibility to desensing by extremely large signals.

Furthermore, the mixer reported in Tae Wook Kim et al. (no mixer improvement was undertaken using this technique in the paper by Aparin, V. et al.) only achieves an IIP3 of at most +9 dBm (+7 dBm at least). According to Aparin, V. et al., "Integrated LMS Adaptive Filter of TX Leakage for CDMA Receiver Front Ends," *Solid-State Circuits Conference, IEEE Journal of,* Volume 41, Issue 5, May 2006 Page(s):1171-1182, (Aparin, V. et al. II) in order to justify the removal of an off-chip filter in CDMA a mixer IIP3 of +24 dBm is required. Hence, further improvement is desirable.

In CDMA and WCDMA the dominant IM3 producer is the leakage from the transmit (Tx) signal through the front-end duplexer. This leakage, which can be as high as −22 dBm at the receiver LNA, interacts with other unwanted out-of-band signals to occasionally produce in-band IM3 products.

In Aparin, V. et al. II, a separate leakage path is introduced directly from the transmit path to the receive path. This leakage signal is subtracted from the duplexer leakage signal, thus removing it. With this signal gone, the linearity requirements of the receiver are significantly reduced. All of the above-mentioned approaches appear to provide circuits that are purely analog in nature.

Since the amount of duplexer leakage varies based on a number of factors, including process, temperature, and duplexer variations, the amount of leakage is controlled by an LMS algorithm implemented in analog circuitry.

However, the LMS algorithm does not in this case compensate for delay through the duplexer and its performance is thus limited over chip-to-chip variation to less than what is required to remove the off-chip filter prior to the mixer.

The LMS filter also substantially increases the front-end noise of the RF receiver (Noise Figure increases from 1.6 dB to almost 3 dB.)

Therefore, there is a need in the art to provide efficient and accurate IM3 cancellation in RF receivers.

SUMMARY OF THE INVENTION

In one aspect, the invention relates to a RF section of a receiver. The RF section of the receiver comprises a first RF circuit for down converting and digitizing a first RF signal received at a first RF signal input terminal and providing a first digitized down-converted signal coupled to a first output terminal; a second RF circuit for down converting and digitizing a second RF signal received at a second RF signal input terminal and providing a second digitized down-converted signal coupled to a second output terminal; and a combining circuit which combines signals at the first output terminal and the second output terminal to produce a down converted and digitized RF signal which has IM3 products attenuated compared to the first digitized down-converted signal. The second RF circuit further comprises an analysis bank that receives and decomposes the second digitized down-converted signal into a plurality of digitized signals having a like plurality of frequency bands to form a like plurality of narrow bandwidth signals; a signal characteristic detection circuit which receives each of the narrow bandwidth signals and provides a group of selected narrow bandwidth signals which contribute to third order harmonic interference (IM3) products of sufficient magnitude to warrant attenuating the IM3 products in the first digitized down-converted signal; a synthesis bank that receives and combines the selected narrow bandwidth signals to form an equivalent IM3 producer signal; and an adaptive lookup table programmed with a model of the equivalent composite nonlinearity of the first RF circuit that receives the IM3 producer signal and provides an IM3 compensation signal at the second output terminal.

In one embodiment, the first and second RF signals are derived from the same or substantially the same RF input signal. In one embodiment, the first and second RF signals are each digitized in quadrature with first and second analog to digital converters (ADCs), respectively. In one embodiment, the first ADC consumes more time-averaged power than the second ADC. In one embodiment, the first ADC is of higher resolution and smaller bandwidth than the second ADC. In one embodiment, the first and second ADC have different input voltage ranges. In one embodiment, the selected narrow bandwidth signals are two real signals. In one embodiment, each of the narrow bandwidth signals decomposed by the analysis bank is passed to the signal characterization circuit, and each of the selected narrow band signals are passed through a synthesis filter bank of a sampling rate lower than the analysis bank prior to being combined. In one embodiment, the narrow bandwidth signals are $2^p-1$ in number, where p is greater than q. In one embodiment the second IDFT matrix has $2^q-5$ inputs connected to a reference voltage In one embodiment, the analysis bank and the synthesis bank are components of a multirate filter bank. In one embodiment, the narrow bandwidth signals are equally spaced across a predetermined frequency band and arranged in monotonically increasing or decreasing frequency order.

In another aspect the invention features a method of attenuating third harmonic interference (IM3) products in a down-converted and digitized RF signal. The method comprises the steps of coupling a first RF signal through a first down converter and a first digitizer to form a first digitized down-converted signal coupled to a first output terminal; coupling the first RF signal or a second RF signal through a second down converter and a second digitizer to form a second digitized down-converted signal coupled to a second output terminal; coupling the second digitized down-converted signal to an analysis bank that receives and decomposes the second digitized down-converted signal into a plurality of digitized signals having a like plurality of frequency bands to form a like plurality of narrow bandwidth signals; coupling the like plurality of narrow bandwidth signals to a signal characteristic detection circuit which receives each of the like plurality of narrow bandwidth signals and provides a group of selected narrow bandwidth signals which are likely to contribute to third harmonic interference (IM3) products of sufficient magnitude to warrant attenuating the IM3 products in the first digitized down-converted signal; coupling the selected narrow bandwidth signals to a synthesis bank that receives and combines the selected narrow bandwidth signals to form a synthetic IM3 producer signal; coupling the IM3 producer signal to an adaptive lookup table programmed with a model of the nonlinearity of the first RF circuit that receives the IM3 producer signal and provides an IM3 compensation signal at the second output terminal; and coupling the IM3 compensation signal at the second output terminal to a combining circuit which combines signals at the first output terminal and the second output terminal to produce a down converted and digitized RF signal which has IM3 products attenuated compared to the first digitized down-converted signal.

In one embodiment, the step of coupling the first RF signal through the first digitizer comprises the step of coupling the RF signal through a first ADC, and the step of coupling the first RF signal or the second RF signal through the second digitizer comprises the step of coupling the RF signal through a second ADC, the first ADC being of higher resolution and smaller bandwidth than the second ADC. In one embodiment, the step of coupling the first RF signal through the first digitizer comprises the step of coupling the RF signal through a first ADC, and the step of coupling the first RF signal or the second RF signal through the second digitizer comprises the step of coupling the RF signal through a second ADC, the first ADC consumes more time-averaged power than the second ADC. In one embodiment, the step of coupling the first RF signal through the first digitizer comprises the step of coupling the RF signal through a first ADC, and the step of coupling the first RF signal or the second RF signal through the second digitizer comprises the step of coupling the RF signal through a second ADC, the first ADC and the second ADC having different input voltage ranges. In one embodiment, the step of providing a group of selected narrow bandwidth signals comprises the step of providing two real narrow bandwidth signals. In one embodiment, the analysis bank and the synthesis bank are components of a multirate filter bank. In one embodiment, the step of decomposing the second digitized down-converted signal into a plurality of digitized signals comprises the step of decomposing the second digitized down-converted signal into M digitized signals, and the step of coupling the selected narrow bandwidth signals through the synthesis bank comprises the step of coupling the 4 selected narrow bandwidth signals through the synthesis bank. In one embodiment, the narrow bandwidth signals are $2^p-1$ in number, where p is greater than q.

In yet a further aspect, the invention relates to an RF section of a receiver for receiving quadrature modulated RF signals. The RF receiver section comprises a first RF circuit for down converting and digitizing a RF signal received at a first RF signal input terminal and providing a first set of digitized down-converted I and Q signals at a first set of output terminals; a second RF circuit that couples the RF signal through an analog nonlinear term generator which is then digitized and down converted to provide a second set of digitized down-converted I and Q signals at a second set of output terminals, the analog nonlinear term generator providing third harmonic interference (IM3) products of the RF signal while attenuating the portions of the RF signal which are not IM3 products; and an adaptive filter which receives the I and Q signals from the first RF circuit as I and Q signals containing interfering IM3 products, and receiving the I and Q signals from the second RF circuit containing compensatory IM3 products of unknown magnitude and phase with respect to the I and Q signals from the first RF section and provides I and Q signals with attenuated IM3 products compared to the I and Q signals at the first set of output terminals.

In one embodiment, the RF signal is a differential signal which is coupled to the gates of a first pair of differential MOSFETs in the analog nonlinear term generator, the first pair of differential MOSFETs having a first single ended output, the first single ended output coupled to a first gate of a second pair of differential MOSFETs, which in turn are coupled to a multiplier cell having two outputs coupled to the second set of output terminals. In one embodiment, the gates of a third pair of differential MOSFETs in the analog nonlinear term generator receive a common mode signal of the differential signals of the RF signal, the third pair of differential MOSFETs having a second single ended output, the second single ended output coupled to a second gate of the second pair of differential MOSFETs. In one embodiment, the second pair of differential MOSFETs is coupled through an amplifier to the multiplier cell. In one embodiment, the adaptive filter is a modified normalized least mean squares (NLMS) filter. In one embodiment, the NLMS filter has symmetric banks of taps and delay circuits around a central summing node coupled to the delay circuits which, in turn, is coupled to the I and Q signals with attenuated IM3 products with an intervening delay circuit.

In still a further aspect, the invention relates to a method of attenuating third harmonic interference (IM3) products in a quadrature modulated RF signal. The method comprises the steps of down converting and digitizing the RF signal; extracting IM3 products from the quadrature modulated RF signal; down converting and digitizing the extracted IM3 products to produce separate I and Q signals with IM3 products; and adaptive filtering I and Q signals from the down-converted and digitized quadrature modulated RF signal using the separate I and Q signals with IM3 products to provide I and Q signals with attenuated IM3 products.

In one embodiment, the step of extracting IM3 products from the quadrature modulated RF signal comprises the step of coupling differential signals of the RF signal to the gates of a first pair of differential MOSFETs in an analog nonlinear term generator, the first pair of differential MOSFETs having a first single ended output, the first single ended output coupled to a first gate of a second pair of differential MOSFETs, which in turn are coupled to a multiplier cell having two outputs coupled to the second set of output terminals. In one embodiment, the method further comprises the step of coupling a common mode signal of the differential signals of the RF signal to the gates of a third pair of differential MOSFETs in the analog nonlinear term generator, the third pair of differential MOSFETs having a second single ended output, the second single ended output coupled to a second gate of the second pair of differential MOSFETs. In one embodiment, the method further comprises the step of coupling the second pair of differential MOSFETs through an amplifier to a multiplier cell.

In one embodiment, the step of adaptive filtering I and Q signals from the down-converted and digitized quadrature modulated RF signal using the I and Q compensatory IM3 signals to provide I and Q signals with attenuated IM3 products comprises the step of coupling the I and Q signals from the down-converted and digitized quadrature modulated RF signal thorough the adaptive filter and coupling the I and Q compensatory IM3 signals to the adaptive filter.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. In the drawings, like numerals are used to indicate like parts throughout the various views.

FIG. 7A is a flowchart of a prior art embodiment of a complex LMS (LMS) algorithm hardware implementation applicable to the least mean squares filter shown in FIG. 5;

FIG. 7B is a diagram of tap I shown in FIG. 7A;

FIG. 7C is a diagram of tap Q shown in FIG. 7A;

DETAILED DESCRIPTION

Figure 1A:
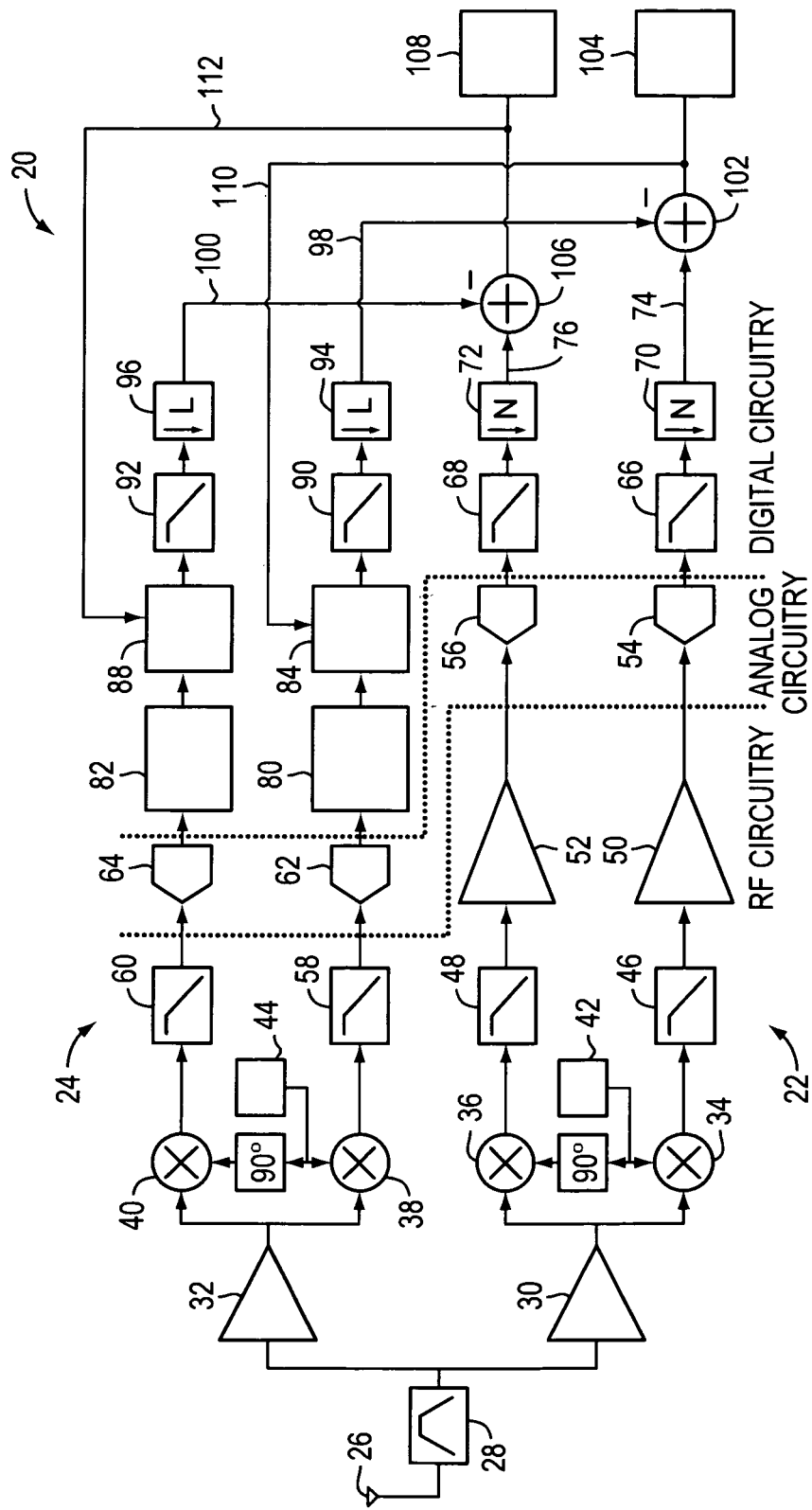
FIG. 1A is a schematic diagram of a RF receiver with attenuated generated IM3 products according to one embodiment of the present invention.

FIG. 1A is a schematic diagram 20 of one embodiment of an RF receiver with attenuated generated IM3 products according to the present invention which has a typical main signal path 22 driven by a low noise amplifier 30 and an auxiliary signal path 24 driven by another low noise amplifier 32. Both of the signal paths 22, 24 receive an RF signal from an antenna 26 which is passed through a bandpass filter 28 to the low noise amplifiers 30, 32. In another embodiment a single LNA could be used for both signal paths. Each of the signal paths 22, 24 has two mixers 34, 36 and 38, 40, respectively, for shifting the RF signal to baseband and separating the I and Q channels, respectively, of the RF signal. The main signal path 22 has a variable local oscillator (LO) 42 which in one embodiment may operate in the frequency range of 935-960 MHz, the frequency range used in GSM cell phones, while the auxiliary signal path 24 may have a LO with a constant frequency of 935 MHz in this embodiment.

The outputs from the mixers 34, 36 in the main path 22 each pass through analog low pass filters 46 and 48, respectively, which in one embodiment may have a 400 KHz bandwidth, the outputs of which are passed through two variable gain amplifiers 50 and 52, respectively, to two ADCs 54 and 56, respectively, which may be sigma-delta ADCs. In one embodiment the ADCs 54, 56 may have a dynamic range of 60-70 dB. The outputs from the mixers 38, 40 in the auxiliary path 24 each pass through analog low pass filters 58 and 60, respectively, which may have a 25 MHz bandwidth, the outputs of which are passed to two ADCs 62 and 64, respectively, which may be Nyquist type ADCs. The ADCs 62, 64 may have a sampling rate of 50 megasamples per second (MSPS).

Typically a high-resolution, small bandwidth ADC such as a sigma-delta (SD) ADC is used in the main signal path 22. In order to digitize a large bandwidth in the auxiliary signal path 24 a Nyquist-rate (Nyq) ADC is used which will inherently have a low resolution for a reasonable power dissipation. However, as stated in the Background of the Invention section above, the amplitude of the IM3 products typically increase as the cube of the undesired portion of the RF input signal to the receiver. In cell phones with the auxiliary signal path 24 the amplitude of the portion of the received RF signal is often low enough that the auxiliary signal path 24 can be shut down. Therefore the ADCs 62, 64 may be of a type which consume more power than the ADCs 42, 46 in the main signal path 22, but since the ADCs 62, 64 are only used intermittently, the time-averaged power of the ADCs 62, 64 may be less than the time-averaged power of the ADCs 42, 46.

In the main signal path 22 the digital outputs from the ADCs 54, 56 are passed through low pass digital decimation filters 66 and 68, respectively, and then through decimators 70 and 72 to provide the demodulated I and Q components, respectively, of the RF signal from the antenna 26 at output nodes 74 and 76, respectively, which contains unwanted IM3 products.

In the auxiliary signal path 24 the digital outputs from the ADCs 62, 64 are passed through multirate filter bank (MRFB) structures 80 and 82, respectively, and then through adaptive lookup tables 84 and 88, respectively, and then through low pass digital decimation filters 90 and 92, respectively, and then through decimators 94 and 96 to provide compensatory I and Q IM3 product components, respectively, at output nodes 98 and 100, respectively. The main signal path Q component at node 74 is combined with the auxiliary signal path Q component at node 98 in an adder 102, the output of which is passed to a Q channel decoder 104. Similarly, the main signal path I component at node 76 is combined with the auxiliary signal path Q component at node 100 in an adder 106, the output of which is passed to a I channel decoder 108.

The adaptive lookup tables 84, 88 receive the output signals from the adders 102 and 106, respectively on the respect lines 110 and 112. The adaptive lookup tables can be circuits similar to that shown in Saleh, A. A. M. et al., "Adaptive Linearization of Power Amplifiers in Digital Radio Systems," *The Bell System Technical Journal*, Volume 62, No. 4, Apr. 1983, pp. 1019-1033.

The operation of the main signal path 22 up to the adder 102 is well known in the art. The auxiliary signal path 24 contains reduced-rate digital IM3 compensation structures including the MRFB structures 80, 82. MRFB structures in general are described in chapter 4 of Vaidyanathan, P. P. V., *Multirate Systems and Filter Banks*, Englewood Cliffs, N.J., Prentice Hall, 1993. The received wideband auxiliary-path signal is spectrally decomposed into frequency subbands through the use of a maximally decimated uniform analysis filter bank. In the embodiment shown in FIG. 1A the outputs of this filter bank each correspond to the signal within a very small slice of the frequency spectrum. The short-term average power in each slice can be analyzed by a received-strength signal indicator (RSSI), which gives an indication as to whether potential IM3 producers are present and, if so, whether the resulting IM3 product will fall within the signal band. Unlike the MRFB shown by Vaidyanathan, the synthesis portion of the MRFBs 80, 82 are of a substantially reduced order than the analysis portion. In the circuit shown in FIG. 1A the analysis portions of the MRFBs 80,82 splice together those frequency subbands which contribute to the problematic IM3 product. The resultant signal is then passed through the adaptive lookup tables 84, 88 which realize a model of the RF receiver main signal path 22 nonlinearity. This operation produces an estimate of the problematic IM3 products. Because the synthesis portion of the filter bank is of a substantially reduced order as compared to the analysis portion, this final operation is performed at a clock rate at least an order of magnitude less than would have otherwise been required relaxing the performance requirements on the adaptive lookup tables 84, 88.

Figure 1B:
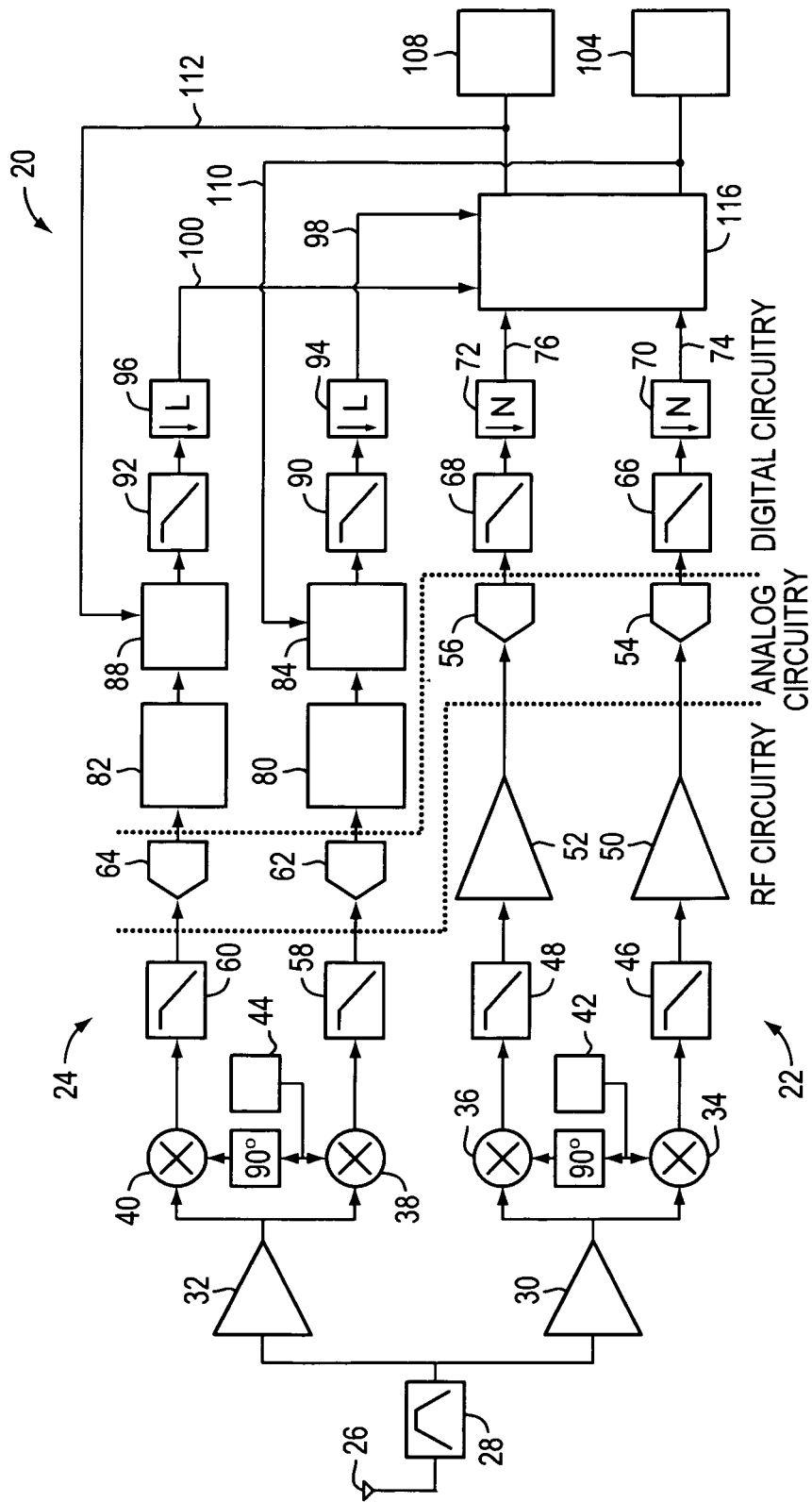
FIG. 1B is a schematic diagram of an alternative embodiment of the circuit shown in FIG. 1A.

FIG. 1B is a schematic diagram of an alternate embodiment 114 of FIG. 1A in which an adaptive equalizer 116 is placed between the outputs of the decimators 94, 96 and the inputs to the I and Q channel decoders 18, 104 respectively. This adaptive equalizer 116 corrects for the linear-time invariant system difference between the first down conversion path and the second downconversion path. The adaptive equalizer 116 may, in one embodiment, be a least mean squares (LMS) filter.

The multirate filter bank-assisted nonlinear compensation technique used in the embodiments of FIGS. 1A and 1B was originally conceived with the possibility of arbitrary IM compensation in mind. (i.e. to correct for IM2, IM3, IM4, . . . , etc. all at once). Hence, a full model of the system nonlinearity is desired. Typically in the literature when such a block is required, an SRAM configured as an adaptive lookup table is used.

It is also known that nonlinearities in integrated circuits exhibit dynamic properties. The circuit shown in FIG. 1B compensates for these nonlinearities due to these dynamic properties with the adaptive lookup tables 118, 119 and the adaptive equalizer 116. The adaptive lookup tables 118, 119 are lookup tables whose inputs are delayed versions of the multirate filter bank output. The outputs of the lookup tables would then be summed. Each lookup table would then correspond to the effective static nonlinearity at a given sample delay.

It is also important to note that for intermodulation (IM) compensation to be effective, the alternate and main paths must be equalized. In order words, the effective linear time invariant (LTI) baseband transfer function difference (including fixed delay) between the main and alternate paths seen by the IM terms is applied to the alternate path. For the most part, the system difference is known a priori and can be implemented as dedicated digital hardware. Some aspects of the equalization will have to be adaptive; for example, in equalizing phase mismatch between the main and alternate path LO signals. Methods for determining the system difference and the performing the equalization are known in the art, examples of which are described below.

Figure 1C:
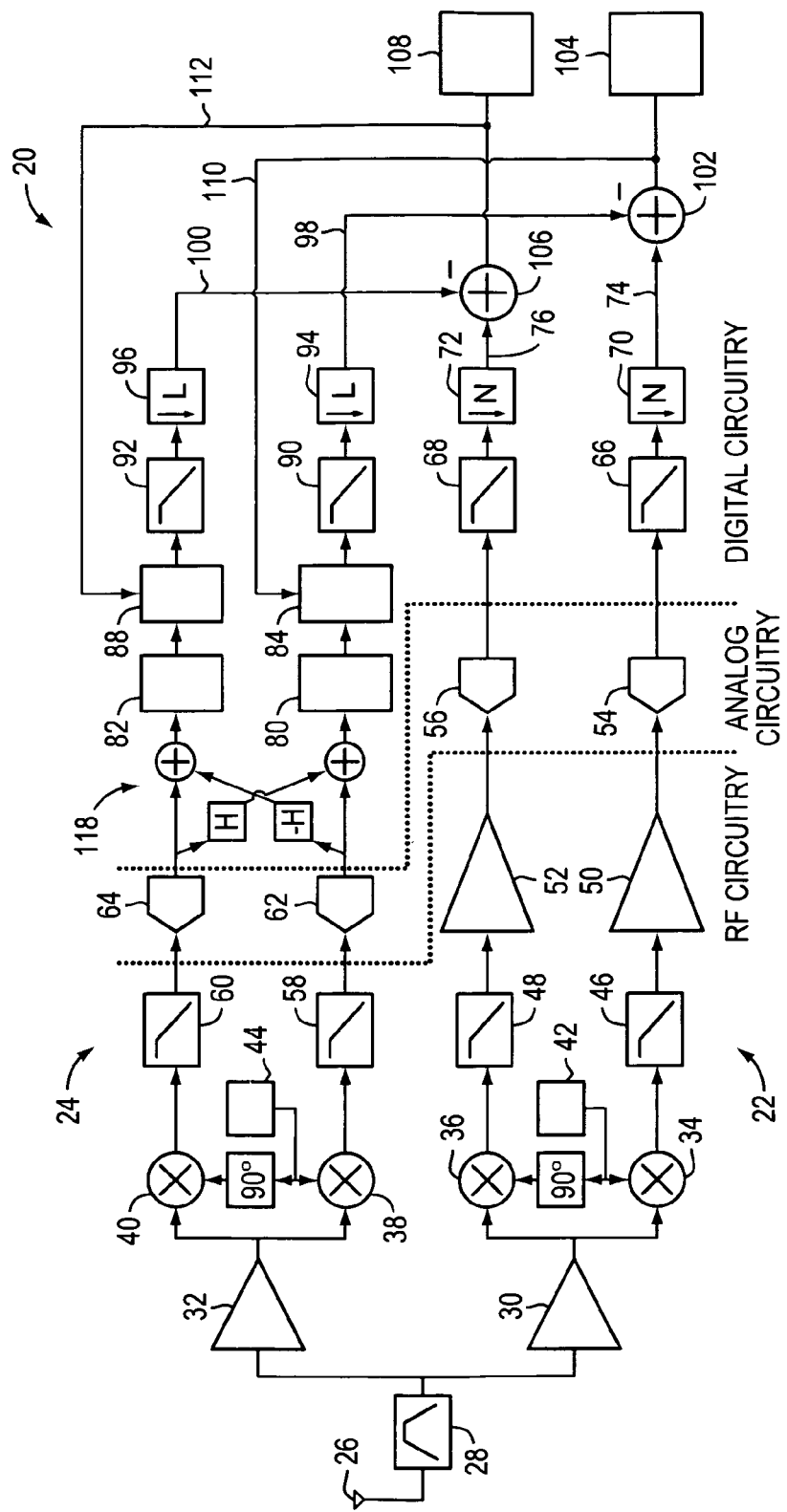
FIG. 1C is a schematic diagram of another embodiment of the circuit shown in FIG. 1A.
Figure 1D:
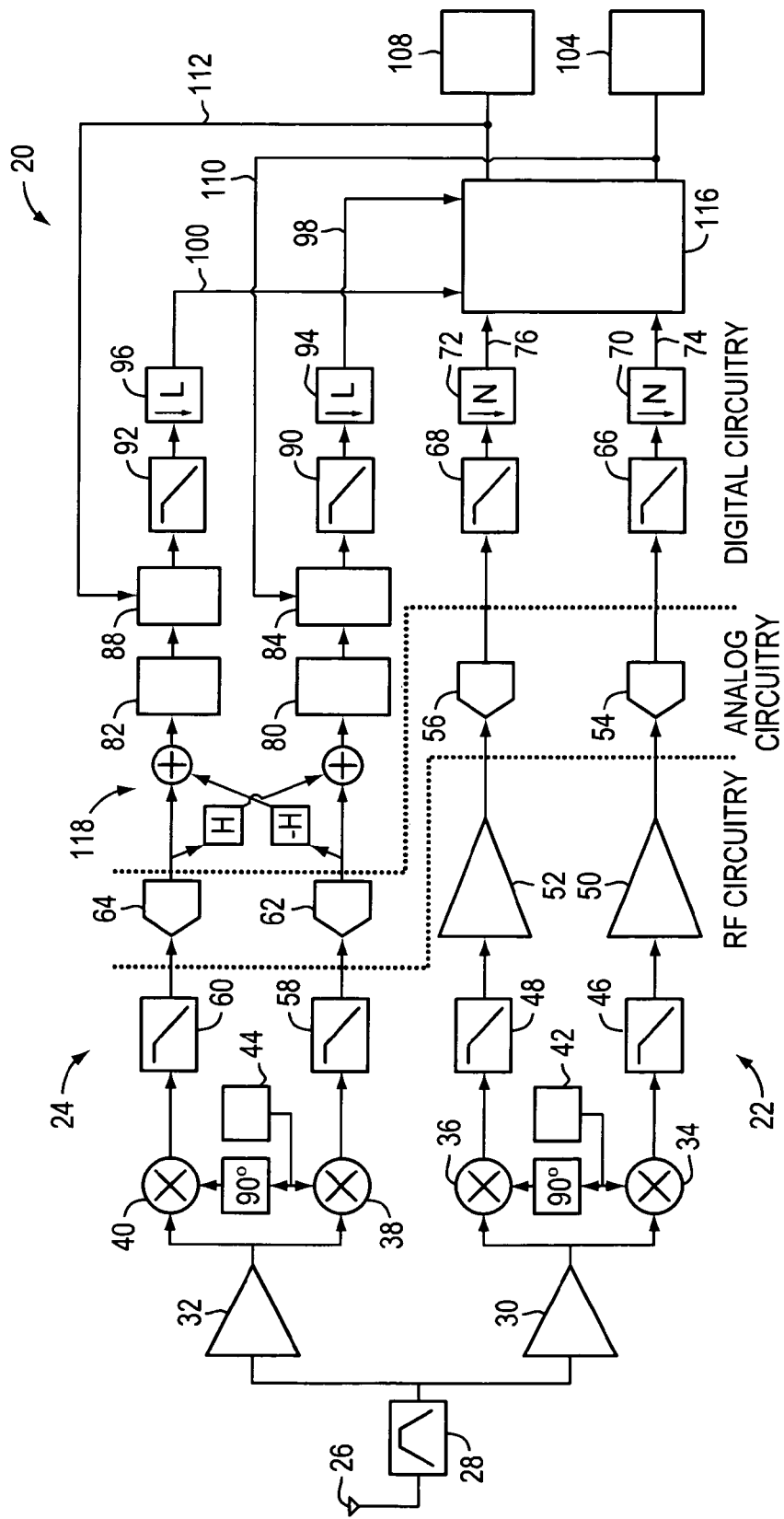
FIG. 1D is a schematic diagram of still another embodiment of the circuit shown in FIG. 1A.

FIGS. 1C and 1D are the schematic diagrams shown in FIGS. 1A and 1B, respectively, with the addition of a Hilbert and inverse Hilbert cross coupled network 118 to remove an image frequency problem which may occur due to unwanted signals in the 935-910 MHz frequency band in addition to wanted signals in the 935-960 frequency band for the frequencies shown in the embodiment of FIGS. 1A-1D.

Figure 2:
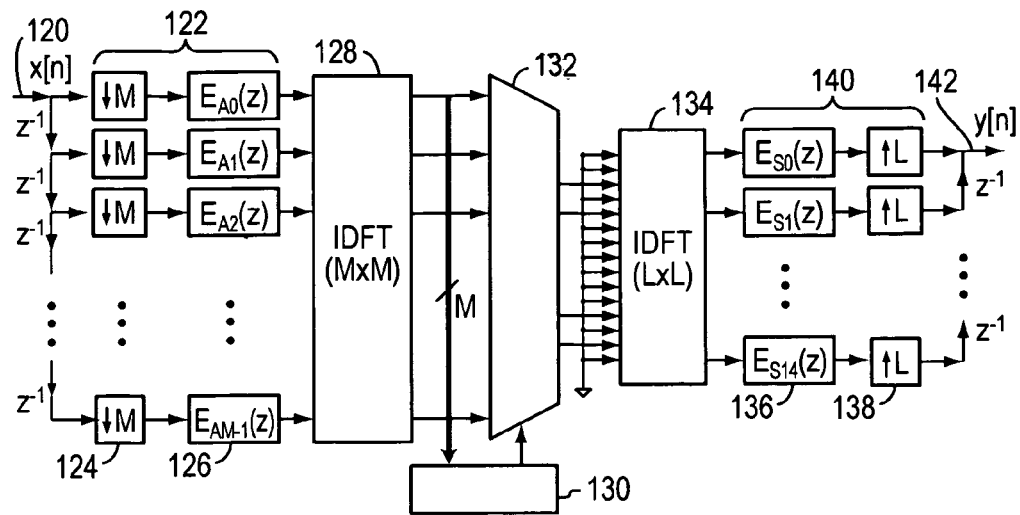
FIG. 2 is a schematic diagram of the multirate filter bank structure shown in FIG. 1A.
Figure 3:
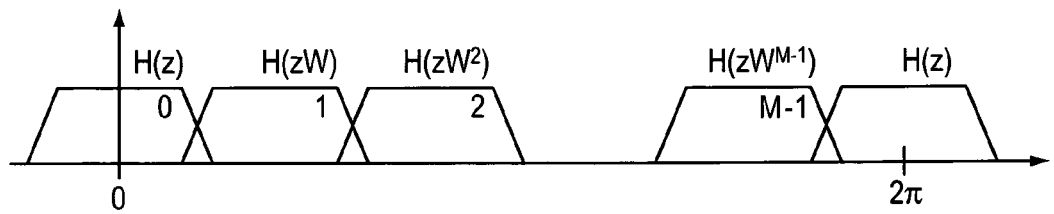
FIG. 3 is a diagram of the frequency bands which make up the subbands in the in the analysis section of the multirate filter bank shown in FIG. 2.

FIG. 2 is a schematic diagram of the MRFB structures 80, 82 shown in FIG. 1A. The multirate filter bank structure takes a wideband digital signal x[n] on input line 120 and spectrally decomposes it into frequency subbands which are downsampled and isolated at each of the M outputs of 128. The composite structure consisting of the delay chain 122 and 128 is known in the literature as an analysis bank. Each of the M input branches of the analysis bank contains an M-fold decimator 124 followed by a polyphase filter 126 which are then input to an M×M inverse digital Fourier transform (IDFT) matrix 128. The outputs of IDFT matrix 128 are passed to an M-Channel received strength signal detector 130, the output of which controls a multiplexer (MUX) 132 which provides 15 outputs including selected outputs of the IDFT matrix 128. The selected outputs of the IDFT Matrix 128 are input to a L×L second IDFT matrix 134. For exemplary purposes, we depict the structure with L=15. The L inputs to the IDFT Matrix 134 which are not signals selected by the M-Channel received strength signal detector 130 are grounded. FIG. 3 also serves as a diagram of the frequency bands which make up the subbands that are the inputs to the synthesis bank if "M" were replaced with "L". Note that for exemplary purposes in FIG. 2 we have chosen L to be equal to 15. In FIG. 2 the top input to the second IDFT matrix 134 corresponds to the leftmost subband in FIG. 3, while the next lower input corresponds to the next leftmost subband in FIG. 3. Each input going down the second IDFT matrix 134 block shown in FIG. 2 corresponds to the next frequency subband to the right in FIG. 3.

The L=15 outputs of the second IDFT matrix 134 are each passed through polyphase filters 136 and N-fold expanders 138 and are then combined through the use of a delay chain. This composite structure realizes the synthesis bank of the MRFBs 80, 82. The recomposed signal y(n) appears on output 142.

Thus, the composite structure in FIG. 2 to the left of the MUX 132 effectively performs the filtering function shown in FIG. 3 where the discrete-time frequency band spanned by x[n] is subject to an array of uniform shifted filters each of which retains a small section of the frequency band.

The portion of FIG. 2 to the right of the MUX 134 puts together only the relevant portions of x[n] that were involved in creating problematic IM3 components in the main path. In this way, all of the other portions of x[n] are discarded and hence the noise that they carry is filtered out from the system.

Prior art multirate filter banks have been symmetric, that is, the number of branches in both the left and right halves are the same. In FIG. 2 there are M=255 branches in the left half the analysis bank and L=15 branches in the right half synthesis bank separated by the MUX 132.

The analysis bank decomposes the signal x[n] on line 120 using the subband complex bandpass filters shown in FIG. 3. In both cases, the frequency band is uniformly subdivided into M=255 sections. In FIG. 2, this filtering is performed by the polyphase structures composed of the decimators 124, polyphase filter components EAX(z) (filters 126), and the IDFT matrix 128. The M outputs of the IDFT matrix 128 correspond to the outputs of the M complex bandpass filters in FIG. 3. In FIG. 3 the discrete-time frequency π corresponds to the continuous-time frequency Fs/2, where Fs is shorthand for the sampling frequency of the discrete-time signal.

The decimated outputs of the analysis bank are then routed to M-Channel received strength signal detector 130. This block determines 1) the power in each of the M complex bandpass filter outputs 2) if the power in any of the M outputs is high enough to result in appreciable IM3 products and 3) if the power in two of the M outputs are such that IM3 products will be produced in the main path, and if the frequency relationship between the two outputs is such that the IM3 products will fall in the desired signal band.

Figure 4:
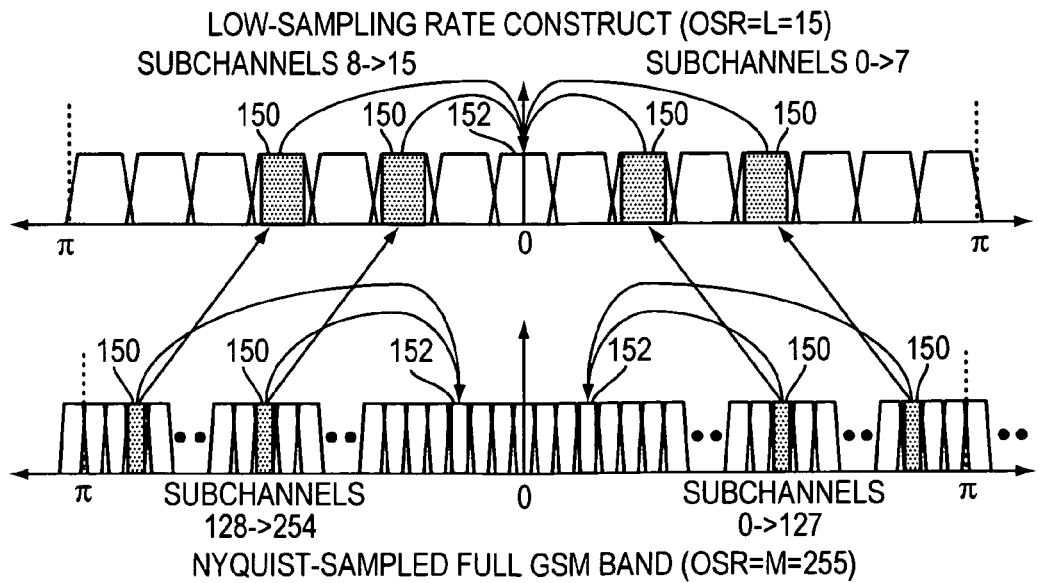
FIG. 4 is a diagram of the mapping of the subbands in the analysis section of FIG. 2 into the subbands of the synthesis section of the multirate filter bank.

If all three conditions are met, the two analysis bank outputs in question are routed through the multiplexer (MUX) to the synthesis bank. Note that because the analysis bank performs a complex decomposition of a real signal, the MUX must route both the positive and negative frequency components to the synthesis bank, where they will be shifted to frequency slots that are symmetric around the zero frequency. This can be seen in FIG. 4, where two real (symmetric around the zero frequency) signals 150 produce in the main receiver path an IM3 component in the desired frequency band 152. Note that the desired frequency band may or may not be part of the analysis bank input, depending on the application. In the main receive path, the desired frequency band will eventually be frequency-shifted such that it is centered around the zero frequency. Within the MRFB, the selected signals are then routed to the synthesis bank such that when the output of the synthesis bank is subject to a model of the main path nonlinearity, the resulting IM3 products also fall around the zero frequency. Subtraction of one signal from the other once they are normalized to the same sampling rate and are possibly also subject to linear time invariant system equalization should then yield cancellation of the IM3 products in the desired signal band.

Because of the discrete-time nature of the multirate filter bank, and for that matter any digital signal processing system, one must be most careful with the application of deliberately nonlinear functions to random processes such as an IM3 producing signal. The Nyquist sampling theorem implies that any generated harmonic components which would normally fall at a frequency greater than half the sampling frequency of the discrete-time signal will alias to a lower frequency that lies between DC (the zero frequency) and half the sampling rate.

Figure 5:
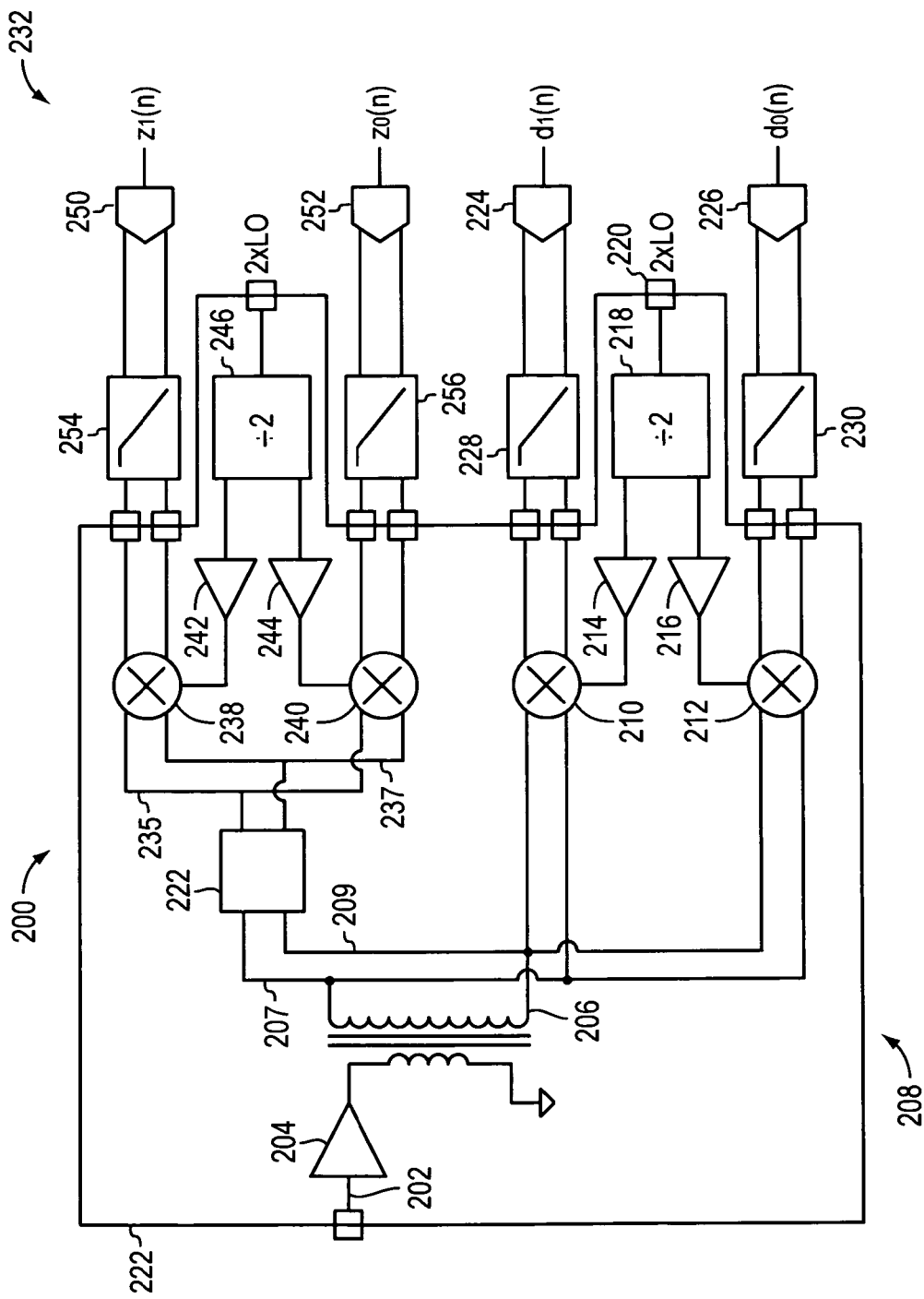
FIG. 5 is a schematic diagram of a RF receiver with analog generated IM3 products according to another embodiment of the present invention.

FIG. 5 is a schematic diagram of a RF receiver 200 with attenuated analog generated IM3 products according to another embodiment of the present invention in which the nonlinear signal processing is done in the analog domain in this implementation. An RF input signal on line 202 is connected to a LNA 204, the output of which is connected to the single-ended input of a balun 206 which may be a transformer balun. The differential outputs of the balun 206 on lines 207 and 209 are inputs for a typical main signal path 208 which are connected to two mixers, an I component mixer 210 and a Q component mixer 212, respectively. The two mixers receive their respective LO signals from two LO buffers, 214 and 216, respectively, which, in turn are driven by a divide-by-2 block 218 which receives a 2×LO signal at an input terminal 220 on a RF chip 222. The divide-by-2 block 218 provides 90 degree phase shifted outputs to the LO buffers 214, 216. The outputs of the mixers 210, 212, which are at baseband, are coupled to two ADCs 224 and 226, respectively through two analog low pass filters 228 and 230, respectively. The two ADCs 224 and 226 are high quality sigma-delta converters.

The differential outputs 207, 209 of the balun 206 are also inputs for an auxiliary signal path 232 and are connected to an analog nonlinear term generator 234, 236, the differential outputs, 235 and 237, of which are connected to two mixers, an I component mixer 238 and a Q component mixer 240, respectively. The two mixers receive their respective LO signals from two LO buffers, 242 and 244, respectively, which, in turn are driven by a divide-by-2 block 246 which receives a 2×LO signal at an input terminal 248 on the RF chip 222. The divide-by-2 block 246 provides 90 degree phase shifted outputs to the LO buffers 214, 216. The outputs of the mixers 238, 240, which are at baseband, are coupled to two ADCs 250 and 252, respectively, through two analog low pass filters 254 and 256, respectively. The two ADCs 250 and 252 are low quality sigma-delta converters compared to the ADCs 224 and 226 in the main signal path 208.

Figures 8A, 8B, 8C:
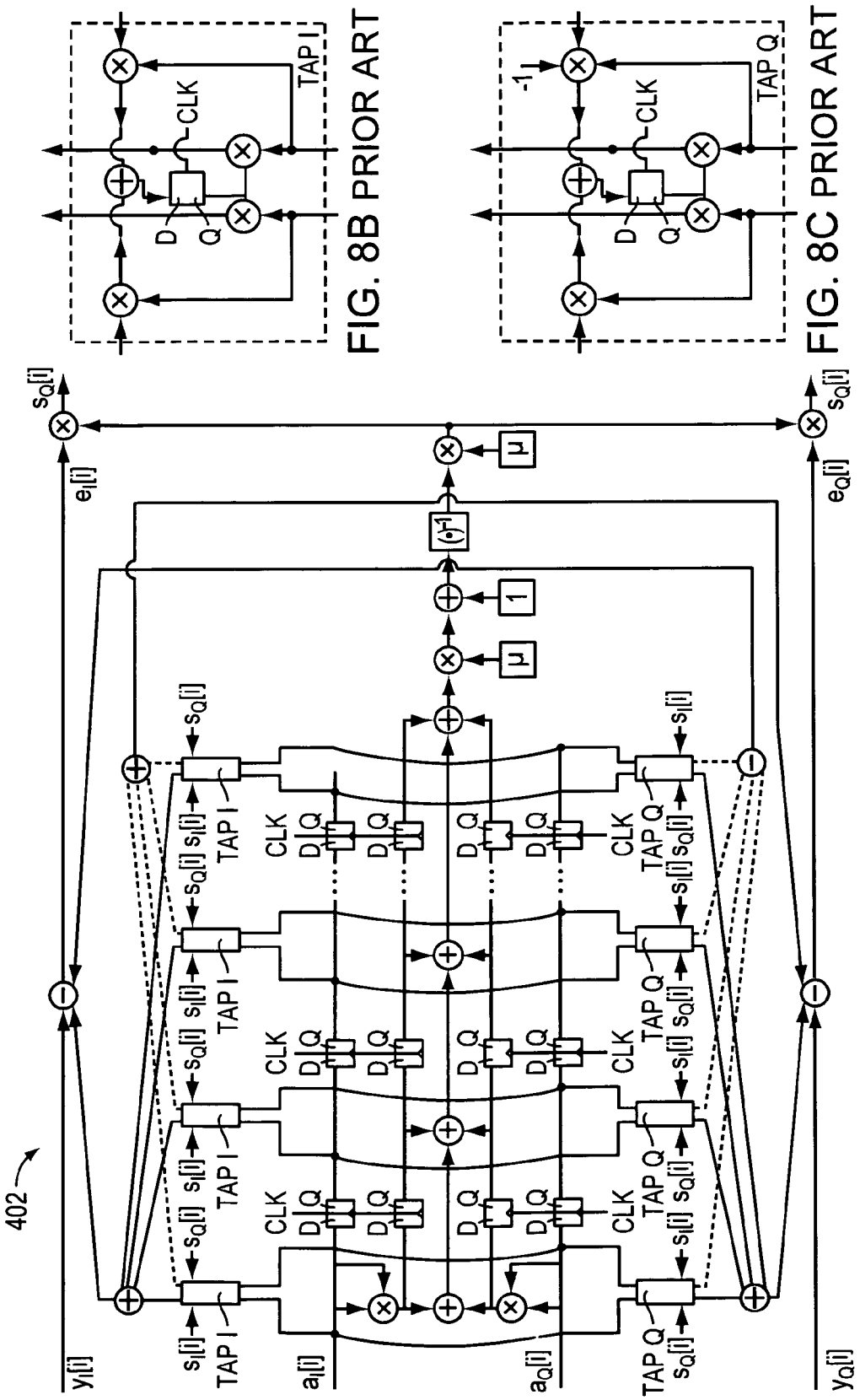
FIG. 8A is a flowchart of a prior art embodiment of a complex NLMS algorithm hardware implementation.
FIG. 8B is a diagram of tap I shown in FIG. 8A.
FIG. 8C is a diagram of tap Q shown in FIG. 8A.

The outputs of the four ADCs 224, 226, 250, 252 are placed on lines labeled $d_I[n]$, $d_Q[n]$, $Z_I[n]$, and $Z_Q[n]$ respectively, in FIG. 5. These four lines are coupled to one of the least mean squared (LMS) filters shown in FIGS. 7A, 8A, and 9A.

The operation of the main circuit path 208 is well known in the art. The auxiliary circuit path 232 generates IM3 products in the indirect term generator 236 and attenuates other portions of the RF signal. The output of the indirect term generator 236 is modulated down to base band and digitized in the ADCs 250, 252. The outputs of the ADCs 250, 252 are coupled through decimators to the inputs to the LMS filters which equalize the linear time invariant filter characteristics of the main and auxiliary signal paths and attenuate the IM3 products in the signal from the main signal path 208 using the outputs of the auxiliary signal path 232.

The integrated balun 206 performs a single-ended to differential conversion of the LNA 204 output. This is necessary in WCDMA RF circuits because the output of the off-chip WCDMA duplexer (not shown) prior to the LNA 204 has only a single-ended output. Placing the balun 206 behind the LNA 204 permits usse of a lossy balun 206, which reduces its on-chip size.

Figure 6:
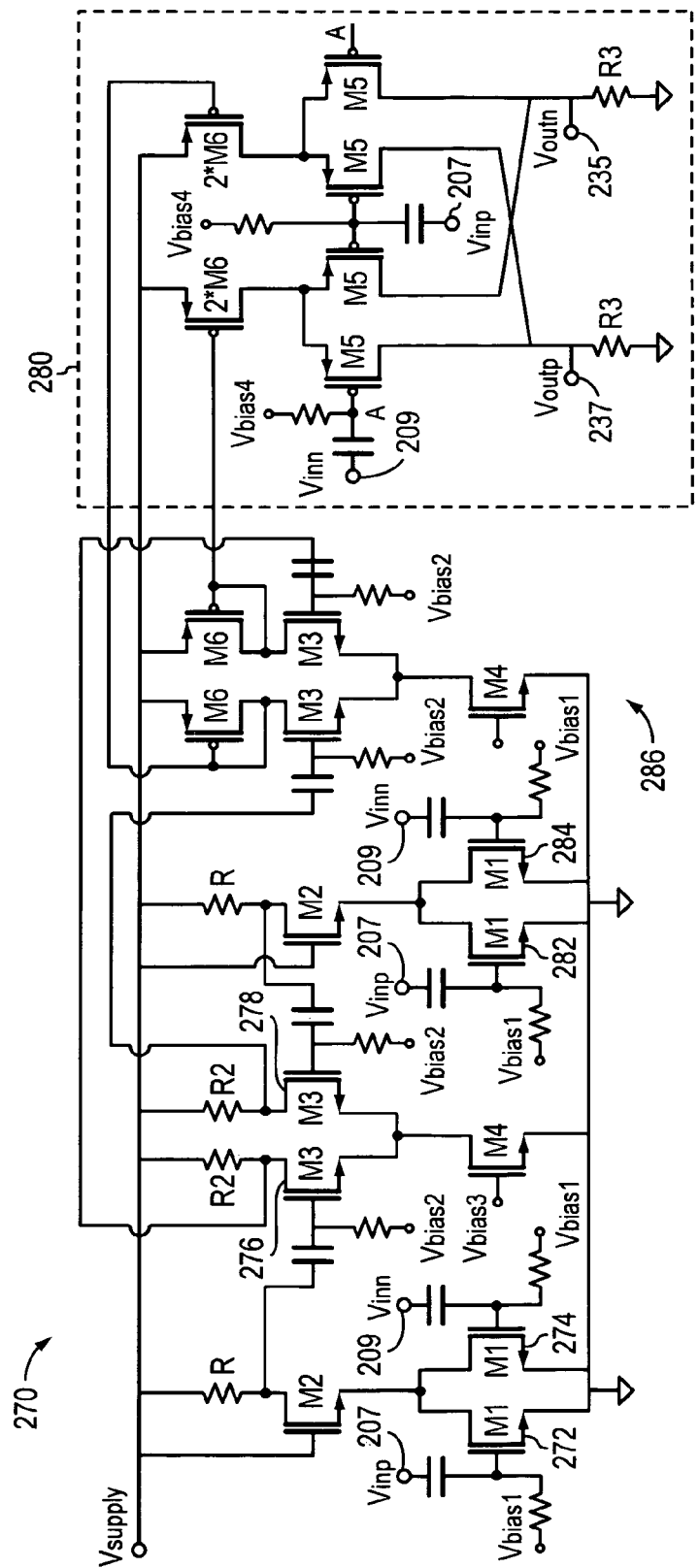
FIG. 6 is a schematic diagram of one embodiment of the analog nonlinear term generator shown in FIG. 5.

FIG. 6 is a schematic diagram 270 of one embodiment of the analog nonlinear term generator 236 shown in FIG. 5. It has been suggested in Shearer, F.; "A precision CMOS analog cubing circuit," *Circuits and Systems*, 2004. *NEWCAS* 2004. *The 2nd Annual IEEE Northeast Workshop on*, 20-23 June 2004 Page(s):281-284, that such a block can be realized by a plurality of MOSFET devices connected in such a way as to utilize the third-order distortion terms of the MOSFET to generate IM3 products. However, a MOSFET is a square-law device and hence produces more 2nd order than 3rd order distortion. Therefore, we choose to design a nonlinear term generator that exploits the $2^{nd}$ order nonlinearity of the MOS device. In FIG. 6, differential devices 272 and 274, with their gates connected to lines 207 and 209, respectively, generate second-order nonlinear terms and in fact compose what is known as a standard squaring circuit. Since the output of devices 272, 274 is single-ended we must perform a single-to-differential ended conversion using devices 276 and 278. Third order terms are generated via an explicit multiplication, by passing the differential second-order current through a Gilbert multiplier 280 that is also connected to the differential inputs 207, 209. Differential devices 282 and 284, counterparts to devices 272 and 274, with their gates connected together and their single ended output connected to the gate of the other of the active balun differential pair 276, 278 not connected to the devices 272, 274 provides common mode rejection due to the fact that they pass the same common mode signal as do devices 272, 274 to device 278. Thus devices 276 and 278 see the same common mode signal in polarity and thus the common mode signal is not converted to a differential signal by devices 276, 278. In order to provide additional gain between the drains of the differential devices 276, 278 and the Gilbert multiplier 280 an additional transconductance stage 286 using current mirrors is placed before the Gilbert multiplier 280.

FIGS. 7A, 8A, 9A, and 10A are respective flowcharts 400, 402, 404, and 406 of four embodiments of complex LMS algorithm hardware implementations applicable to the LMS filter shown in FIG. 5. The outputs $Z_I[n]$, $Z_Q[n]$, $d_I[n]$, and $d_Q[n]$ in FIG. 5 are connected to inputs $a_I[i]$, $a_Q[i]$, $y_I[i]$, and $y_Q[n]$ in FIG. 7A, and to inputs $a_I[i]$, $a_Q[i]$, $m_I[i]$, and $m_Q[n]$ in FIGS. 9A and 10A, respectively.

The concept of using artificially-generated intermodulation products in conjunction with a canonical LMS equalizer has been established in the literature within high-level system studies by Valkama, M. et al., "Advanced Digital Signal Processing Techniques For Compensation Of Nonlinear Distortion In Wideband Multicarrier Radio Receivers," *Microwave Theory and Techniques, IEEE Transactions on*, Volume 54, Issue 6, Part 1, June 2006 Page(s):2356-2366; and Faulkner, M., "DC Offset And Im2 Removal In Direct Conversion Receivers," *Communications, IEEE Proceedings-*, Volume 149, Issue 3, June 2002 Page(s):179-184. In essence, the LMS adaptive filter attempts to perform a channel estimate of the linear time-invariant ratio of the system generating the original nonlinearities (main path) and the system generating the replica nonlinearities (alternate path).

The canonical LMS problem has been recently shown to proceed directly from a state-space model of the channel estimate problem by Hassibi, B. et al., "H∞ Optimality of the LMS Algorithm," *Signal Processing, IEEE Transactions on* [see also *Acoustics, Speech, and Signal Processing, IEEE Transactions on*], Volume 44, Issue 2, February 1996 Page(s):267-280 (Hassibi et al. I); and Hassibi, B. et al., "Linear Estimation in Krein Spaces. II. Applications," *Automatic Control, IEEE Transactions on*, Volume 41, Issue 1, January 1996 Page(s):34-49 (Hassibi et al. II). In this case, x=the state to be estimated, namely a finite-length column vector of discrete-time filter taps
a=several adjacent samples of the replica nonlinearity term information, in row vector form
y=the current output of the original nonlinear system
v=additive Gaussian noise from the original nonlinear system $$x_{i+1} = x_i$$

$$y_i = a_i x_i + v_i \quad (1.1)$$

All terms above are complex-valued. Note that variable names have been changed from the original publication.

Hassibi II has shown that two of the H∞ solutions to this problem are the LMS and NLMS filters. The LMS filter algorithm computes the filter tap estimates as follows:

$$\hat{x}_{i+1} = \hat{x}_i + \mu a^*_i (y_i - a_i \hat{x}_i) = \hat{x}_i + \mu a^*_i e_i \quad (1.2)$$

Note that μ is an integration constant used to adjust the convergence properties of the algorithm.

The NLMS filter algorithm computes the filter tap estimates in a slightly different way, as shown below:

$$\hat{x}_{i+1} = \hat{x}_i + \frac{\mu}{1 + \mu a_i a^*_i} a^*_i (y_i - a_i \hat{x}_i) = \hat{x}_i + \frac{\mu}{1 + \mu a_i a^*_i} a^*_i e_i \quad (1.3)$$

It is known that for the LMS algorithm to converge, $\mu < 2/\lambda_{max}$ where $\lambda$max is the largest eigenvalue of the autocorrelation matrix $E[a_i a_j^*]$ where the (now) column vectors $y_i$ have a length equal to the column vector $x_i$. However, the settling time of the algorithm is approximately: $1/F_s \mu \lambda_{min}$ where Fs is the sampling rate of the discrete-time system. This creates a problem for systems in which the eigenvalues of $E[a_i a_j^*]$ span several orders of magnitude.

In WCDMA systems, the nonlinear distortion terms created by the Tx leakage cause $E[a_i a_j^*]$ to have eigenvalues of 6 or 7 orders of magnitude apart. In this case, it is advantageous to use the NLMS algorithm.

In chapter 6 of Haykin, S., *Adaptive Filter Theory*, Prentice Hall, 2002, Upper Saddle River, N.J., it is shown that for the NLMS algorithm to converge, μ must meet a constraint independent of the eigenvalues of $E[a_i a_j^*]$. In this case, the convergence time of the NLMS algorithm can be reduced to less than that of the LMS algorithm.

In order to equalize two quadrature systems, it seems natural to use complex LMS/NLMS. Note that canonical LMS/NLMS is defined as complex LMS/NLMS.

If the only difference between the main path and the alternate path were a static (DC) Givens rotation, the optimal LMS/NLMS filter would be a complex delta function with time delay zero:

$$\hat{x}_{opt} = (x_I + jx_Q) \delta_0 \quad (2.1)$$

And, $$y_i = y_{Ii} + j y_{Qi}$$

$$h_i = h_{Ii} + j h_{Qi}$$

Note that xI and xQ correspond to the following Givens rotation:

$$\begin{bmatrix} y_{Ii} \\ y_{Qi} \end{bmatrix} = \begin{bmatrix} \cos(\theta_R) & \sin(\theta_R) \\ -\sin(\theta_R) & \cos(\theta_R) \end{bmatrix} \begin{bmatrix} h_{Ii} \\ h_{Qi} \end{bmatrix} \quad (2.2)$$

Equating the Givens rotation with the complex equation:

$$y_i = h_i x$$

$$(y_{Ii} + j y_{Qi}) = (h_{Ii} + j h_{Qi})(x_I + jx_Q)$$

$$(y_{Ii} + j y_{Qi}) = (h_{Ii} x_I - h_{Qi} x_Q) + j((h_{Qi} x_I + h_{Ii} x_Q)$$

And recasting in matrix form for clarity $$\begin{bmatrix} y_{Ii} \\ y_{Qi} \end{bmatrix} = \begin{bmatrix} x_I & -x_Q \\ x_Q & x_I \end{bmatrix} \begin{bmatrix} h_{Ii} \\ h_{Qi} \end{bmatrix}$$

yields the following solutions:

$$x_I = \cos(\theta_R)$$

$$x_Q = -\sin(\theta_R).$$

Note that a solution only exists because the center matrix in the above equation is a scaled Givens rotation matrix.

Unfortunately, any quadrature downconversion system, including those shown in FIGS. 1A, 1B, 1C, 1D, and 5 will have some degree of quadrature mismatch. In fact, this mismatch is often substantial in direct conversion systems, since a high degree of quadrature mismatch is not required for image rejection, as it is in IF downconversion systems.

The more general case can be derived simply as follows:

1. Assume an incoming bandpass signal representing the nonlinear terms in question:

$$n(t) = n_c(t)\cos(\omega t) + n_s(t)\sin(\omega t) \quad (2.3)$$

2. Assume that the main path applies the following downconversion sinusoids:

$$mp_I(t) = \cos(\omega t + \theta_M + \theta_R)$$

$$mp_Q(t) = \sin(\omega t + \theta_R) \quad (2.4)$$

And that the alternate path applies the following downconversion sinusoids:

$$ma_I(t) = \cos(\omega t + \theta_A)$$

$$ma_Q(t) = \sin(\omega t) \quad (2.5)$$

Where
$\theta_R$ is the rotation mismatch between the main and the alternate path
$\theta_M$ is the I/Q phase mismatch in the main path
$\theta_A$ is the I/Q phase mismatch in the alternate path 3. The relevant rotation matrix is now:

$$\begin{bmatrix} y_{Ii} \\ y_{Qi} \end{bmatrix} = \begin{bmatrix} \cos(\theta_M + \theta_R)\sec(\theta_A) & -\cos(\theta_M + \theta_R)\tan(\theta_A) + \sin(\theta_M + \theta_R) \\ -\sin(\theta_R)\sec(\theta_A) & \sin(\theta_R)\tan(\theta_A) + \cos(\theta_R) \end{bmatrix} \begin{bmatrix} h_{Ii} \\ h_{Qi} \end{bmatrix} \quad (2.6)$$

However, this is no longer a Givens rotation matrix and by the argument given above, there is no solution for $x_{I,opt}$ and $x_{Q,opt}$. It can also be shown by simulation that such phase mismatch leads to a higher noise floor in the main path signal where IM3 products have been attenuated.

Shown in FIG. 7A is the flowchart of an embodiment of a hardware implementation of a conventional multitap complex LMS algorithm. Note that the state variable estimates "$\hat{x}_i$" are contained at the register outputs of the taps. The real part of each element of "$\hat{x}_i$" is contained in Tap I, shown in FIG. 7B, while the imaginary part of each element of "$\hat{x}_i$" is contained in Tap Q, shown in FIG. 7C.

This implementation follows directly from Eq. 1.2 and can be seen by expanding the matrix equation into its complex arguments.

The "cleaned" main path signals, i.e. where IM products have been attenuated, are denoted as $e_I[i]$ and $e_Q[i]$ in FIG. 7A. That is, while the nonlinear terms dominate the inputs $a_I[i]$, $a_Q[i]$, $y_I[i]$, and $y_Q[i]$, the residual after the subtraction of the equalized nonlinear terms is the desired communications signal. Hence, any "noise" in the algorithm convergence will add directly to $e_I[i]$ and $e_Q[i]$.

It can be seen from Equation 2.2, Equation 2.6, and FIG. 7A that the reason an optimal solution does not exist for the filter taps is that for any given complex tap, there are only two degrees of freedom; that is, magnitude and phase.

In order to develop a structure that has the maximum possible number of degrees of freedom in which the tap multiplications from $a_I[i]$ and $a_Q[i]$ to the summations with $a_I[i]$ and $a_Q[i]$, respectively, and in such a way that the structure retains the LMS (or NLMS) property we define two sets of complex tap weights. These complex weights are defined in the real domain in order to make clear the transition to the hardware implementation. The hardware implementation can be obtained for the modified LMS algorithm directly via matrix substitution due to the fact that the LMS algorithm can be derived from a matrix state-space model as shown in Hassibi et al. I.

Therefore, we define:

$$x_i = \begin{bmatrix} w_i \\ x_i \end{bmatrix} = \begin{bmatrix} \begin{bmatrix} w_{Ii} \\ w_{Qi} \end{bmatrix} \\ \begin{bmatrix} x_{Ii} \\ x_{Qi} \end{bmatrix} \end{bmatrix} \quad (3.4)$$

$$y_i = \begin{bmatrix} y_{Ii} \\ y_{Qi} \end{bmatrix} \quad (3.5)$$

$$a_i = \begin{bmatrix} a_{Ii} & a_{Qi} \end{bmatrix} \quad (3.6)$$

$$e_i = \begin{bmatrix} e_{Ii} \\ e_{Qi} \end{bmatrix} \quad (3.7)$$

$$\hat{x}_{i+1} = \hat{x}_i + \mu a_i^*(y_i - a_i \hat{x}_i) \quad (1.2)$$

$$\begin{bmatrix} \hat{x}_{Ii+1,1} + j\hat{x}_{Qi+1,1} \\ \vdots \\ \hat{x}_{Ii+1,N} + j\hat{x}_{Qi+1,N} \end{bmatrix} = \begin{bmatrix} \hat{x}_{Ii,1} + j\hat{x}_{Qi,1} \\ \vdots \\ \hat{x}_{Ii,N} + j\hat{x}_{Qi,N} \end{bmatrix} + \mu \begin{bmatrix} a_{Ii+1,1} - ja_{Qi+1,1} \\ \vdots \\ a_{Ii+1,N} - ja_{Qi+1,N} \end{bmatrix}(NUM) \quad (3.1)$$

$NUM =$
$(y_{Ii+1} - (a_{Ii+1,1}\hat{x}_{Ii,1} - a_{Qi+1,1}\hat{x}_{Qi,1}) - \ldots - (a_{Ii+1,N}\hat{x}_{Ii,N} - a_{Qi+1,N}\hat{x}_{Qi,N})) + j(y_{Ii+1} - (a_{Ii+1,1}\hat{x}_{Qi,1} + a_{Qi+1,1}\hat{x}_{Ii,1}) - \ldots - (a_{Ii+1,N}\hat{x}_{Qi,N} + a_{Qi+1,N}\hat{x}_{Ii,N})) = e_{Ii+1} + je_{Qi+1}$ $$\hat{x}_{Ii+1,k} = \hat{x}_{Ii,k} + \mu(e_{Ii+1}a_{Ii+1,k} + e_{Qi+1}a_{Qi+1,k}) \quad (3.2)$$

$$\hat{x}_{Ii+1,k} = \hat{x}_{Ii,k} + \mu(e_{Qi+1}a_{Ii+1,k} - e_{Ii+1}a_{Qi+1,k}) \quad (3.3)$$

Where as before, the elements $a_{Ii}$ and $a_{Qi}$ are row vectors of length N, and elements $w_{Qi}$, $x_{Ii}$, $x_{Qi}$ are column vectors of height N.

Substituting into (1.2):

$$\begin{bmatrix} e_{Ii} \\ e_{Qi} \end{bmatrix} = \begin{bmatrix} y_{Ii} \\ y_{Qi} \end{bmatrix} - [a_{Ii} \; a_{Qi}] \begin{bmatrix} \begin{bmatrix} \hat{w}_{Ii} \\ \hat{w}_{Qi} \end{bmatrix} \\ \begin{bmatrix} \hat{x}_{Ii} \\ \hat{x}_{Qi} \end{bmatrix} \end{bmatrix} \quad (3.8)$$

$$= \begin{bmatrix} y_{Ii} - a_{Ii}\hat{w}_{Ii} - a_{Qi}\hat{x}_{Ii} \\ y_{Qi} - a_{Ii}\hat{w}_{Qi} - a_{Qi}\hat{x}_{Qi} \end{bmatrix}$$

$$\begin{bmatrix} \begin{bmatrix} \hat{w}_{Ii+1} \\ \hat{w}_{Qi+1} \end{bmatrix} \\ \begin{bmatrix} \hat{x}_{Ii+1} \\ \hat{x}_{Qi+1} \end{bmatrix} \end{bmatrix} = \begin{bmatrix} \begin{bmatrix} \hat{w}_{Ii} \\ \hat{w}_{Qi} \end{bmatrix} \\ \begin{bmatrix} \hat{x}_{Ii} \\ \hat{x}_{Qi} \end{bmatrix} \end{bmatrix} + \mu \begin{bmatrix} a_{Ii} \\ a_{Qi} \end{bmatrix} \begin{bmatrix} e_{Ii} \\ e_{Qi} \end{bmatrix} \quad (3.9)$$

$$= \begin{bmatrix} \begin{bmatrix} \hat{w}_{Ii} \\ \hat{w}_{Qi} \end{bmatrix} \\ \begin{bmatrix} \hat{x}_{Ii} \\ \hat{x}_{Qi} \end{bmatrix} \end{bmatrix} + \mu \begin{bmatrix} a_{Ii} \begin{bmatrix} e_{Ii} \\ e_{Qi} \end{bmatrix} \\ a_{Qi} \begin{bmatrix} e_{Ii} \\ e_{Qi} \end{bmatrix} \end{bmatrix}$$

$$= \begin{bmatrix} \begin{bmatrix} \hat{w}_{Ii} + \mu a_{Ii} e_{Ii} \\ \hat{w}_{Qi} + \mu a_{Ii} e_{Qi} \end{bmatrix} \\ \begin{bmatrix} \hat{x}_{Ii} + \mu a_{Qi} e_{Ii} \\ \hat{x}_{Qi} + \mu a_{Qi} e_{Qi} \end{bmatrix} \end{bmatrix}$$

The NLMS algorithm can be computed similarly by dividing "µ" by:

$$1 + \mu a_i a_i^* = 1 + \mu [a_{Ii} \; a_{Qi}] \begin{bmatrix} a_{Ii} \\ a_{Qi} \end{bmatrix} \quad (3.10)$$

$$= 1 + \mu \left[ \sum_{k=1}^{N} (a_{Ii,k}^2 + a_{Qi,k}^2) \right]$$

Figures 9A, 9B:
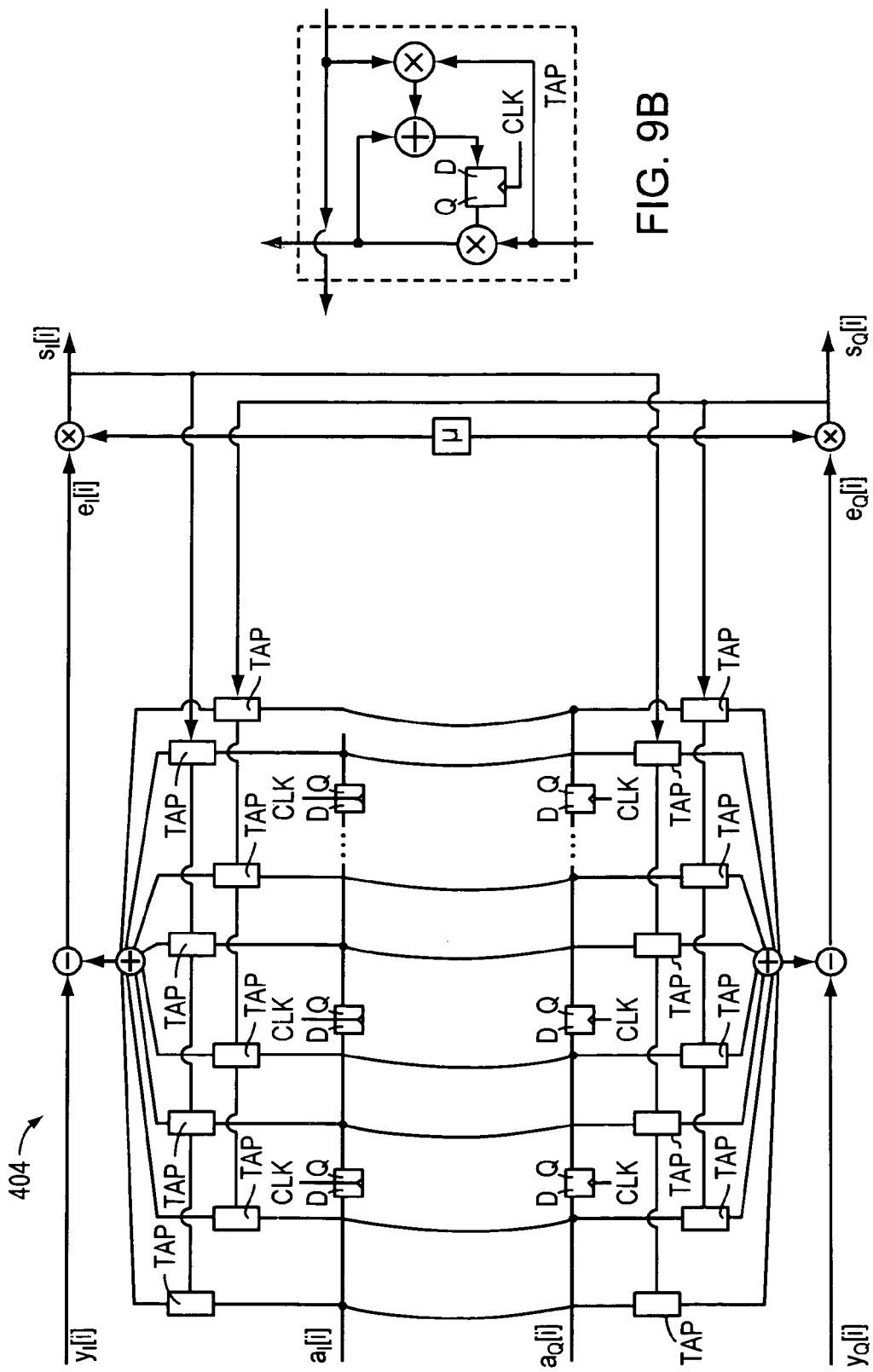
FIG. 9A is a flowchart of an embodiment of a modified complex LMS algorithm hardware implementation.
FIG. 9B is a diagram of each of the taps shown in FIG. 8A.
Figure 10A:
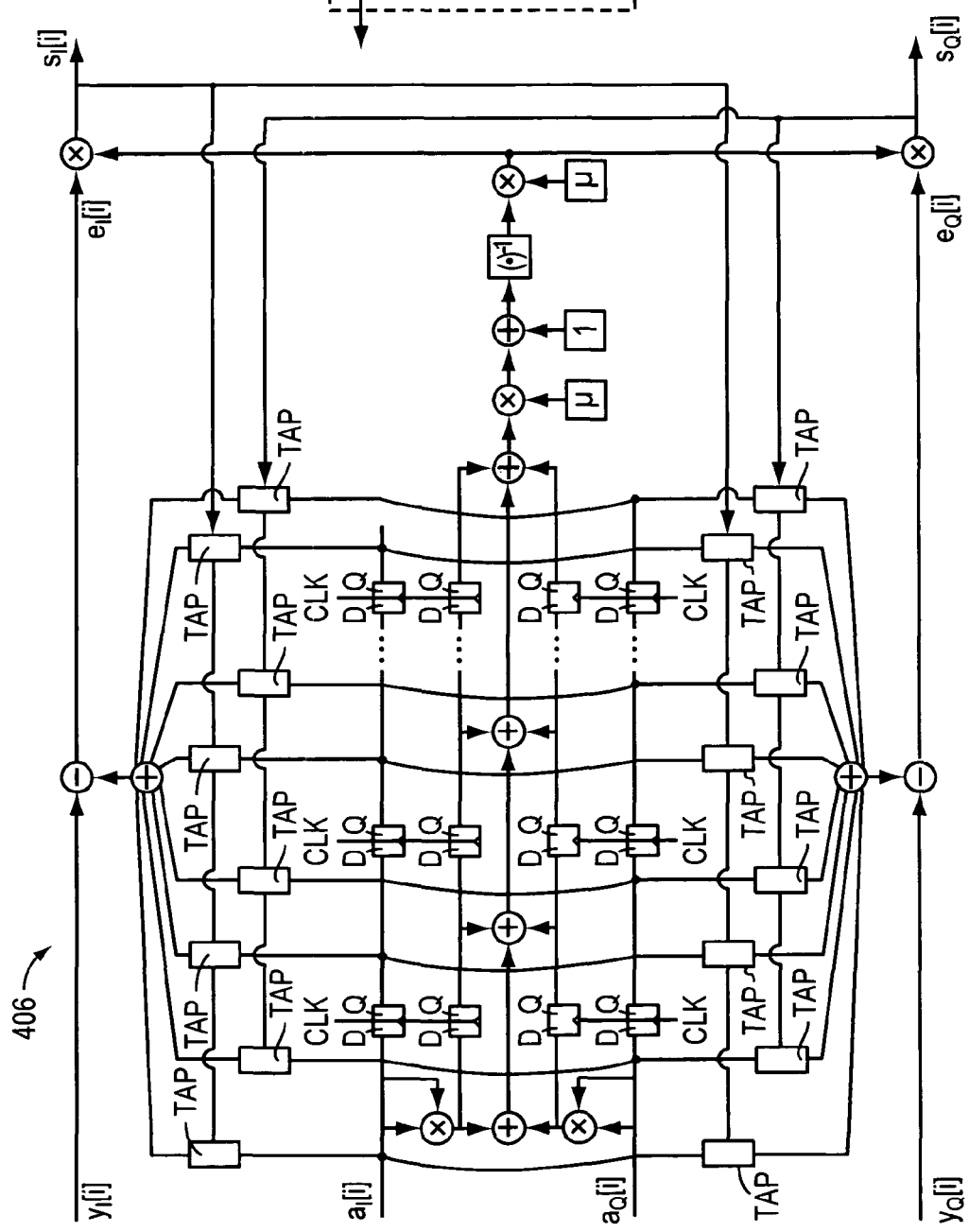
FIG. 10A is a flowchart of another embodiment of a modified complex NLMS algorithm hardware implementation.
Figure 10B:
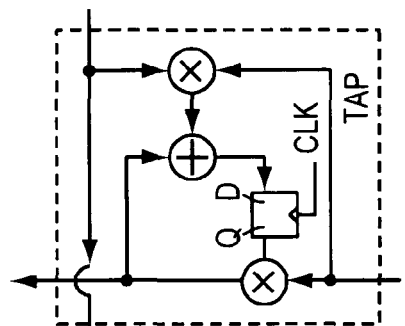
FIG. 10B is a diagram of each of the taps shown in FIG. 9A.

The modified LMS structure is shown FIG. 9A. The modified NLMS structure is shown FIG. 10A.

We have described a specific embodiment that is directed to performing cancellation or reduction of the IM3 products in a RF signal. To accomplish this cancellation or reduction, the RF signal is processed in a main path, which in the embodiment described comprises processing the I and Q products of the signal. In addition, a portion of the signal is processed in an auxiliary path in which synthesized IM3 products are generated. The synthesized IM3 products are then matched to and subtracted from the RF signal processed in the main path, thereby reducing or canceling the IM3 products. While the present application relates to attenuating IM3 products, the methods described and circuits shown can be modified to attenuate other IM products such as IM5 products, IM7 products, and so forth. In addition, it is possible in principle to provide two or more auxiliary paths, one auxiliary path for each product or signal component that one wishes to reduce or to cancel, hereby reducing or canceling a plurality of such unwanted signal components at the same time.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Principle of Nonlinear Application Invariance

Here, we use the principle of nonlinear application invariance to explain why we need a dual Hartley image reject architecture. For now it is convenient to put aside the image reject architecture and to merely recognize the fact that the inputs of the two multirate filter bank structures are the desired IM3 producers downconverted from RF frequencies to IF (intermediate) frequencies. One input has been downconverted by a sine wave, while the other branch has been downconverted by a cosine wave.

Main Path

Here, we undertake the analysis of the form of an IM3 signal that is generated at RF and is downconverted in quadrature by using I and Q paths. We assume that the IM3 signal is formed by two-signal intermodulation with one of the signals being a modulated signal, while the other is a continuous-wave (CW) signal. A CW signal is just a sinusoidal waveform. This choice is used because it frequently occurs in communication system standard specifications. Switching the signal relation (i.e. squaring the CW signal and multiplying by the modulated signal) yields the same result.

$$x(t) = n_c(t)\cos((\omega_c + \omega_s)t) + n_s(t)\sin((\omega_c + \omega_s)t)$$

$$y(t) = A \cos((\omega_c + 2\omega_s)t + \theta)$$

We compute the IM3 product which falls in the target band. Without loss of generality, and for notational simplicity, we denote the center of the target band as coincident with the carrier frequency $\omega_c$. In this case, the relevant IM3 component can be derived:

$$x^2(t) = n_c^2(t)\left(\frac{A}{2} + \frac{A}{2}\cos(2(\omega_c + \omega_s)t)\right) - $$
$$n_s^2(t)\left(\frac{A}{2} - \frac{A}{2}\cos(2(\omega_c + \omega_s)t)\right) + 2n_c(t)n_s(t)\left(\frac{A}{2}\sin(2(\omega_c + \omega_s)t)\right)$$

Taking only components that will contribute to the desired IM3 product and multiplying by y(t) yields:

$$v(t) = \{x^2(t)y(t)\}_{IM3}$$
$$= \frac{A}{4}(n_c^2(t) - n_s^2(t))\cos(\omega_c t - \theta) + \frac{A}{2}n_c(t)n_s(t)\sin(\omega_c t - \theta)$$

At the I and Q downconversion mixers we multiply by the beater signals $2\cos(\omega_c t + \psi)$ and $2\sin(\omega_c t + \psi)$ to obtain the I and Q components of the IM3 products. Some algebra yields:

$$IM3_I(t) = \frac{A}{4}(n_c^2(t) - n_s^2(t))\cos(\theta + \psi) - \frac{A}{2}n_c(t)n_s(t)\sin(\theta + \psi)$$

$$IM3_Q(t) = \frac{A}{4}(n_c^2(t) - n_s^2(t))\sin(\theta + \psi) + \frac{A}{2}n_c(t)n_s(t)\cos(\theta + \psi)$$

Alternate Path

Here, we undertake the analysis of the form of an IM3 signal that is generated at digital IF, namely at the output of the multirate filter bank synthesis bank. The IM3 producer signals are first downconverted to IF in quadrature by using I and Q paths.

Given modulated and sinusoidal signals in the alternate path.

$$x(t)=n_c(t)\cos((\omega_c+\omega_s)t)+n_s(t)\sin((\omega_c+\omega_s)t)$$

$$y(t)=A\cos((\omega_c+2\omega_s)t+\theta)$$

At the I and Q mixers we multiply by the beater signals $2\cos(\omega_c t+\psi)$ and $2\sin(\omega_c t+\psi)$ to obtain the I and Q components of the IM3 producers. Some algebra yields:

$$x_I(t)=n_c(t)\cos(\omega_s t-\psi)+n_s(t)\sin(\omega_s t-\psi)$$

$$y_I(t)=A\cos(2\omega_s t+\theta-\psi)$$

$$x_Q(t)=-n_c(t)\sin(\omega_s t-\psi)+n_s(t)\cos(\omega_s t-\psi)$$

$$y_Q(t)=-A\sin(2\omega_s t+\theta-\psi)$$

We compute the IM3 product which falls in the target band. Without loss of generality, and for notational simplicity, we denote the center of the target band as coincident with the carrier frequency $\omega_c$. In this case, the relevant IM3 component can be derived:

$$x_I^2(t) = n_c^2(t)\left(\frac{1}{2}+\frac{1}{2}\cos(2\omega_s t-2\psi)\right) -$$
$$n_s^2(t)\left(\frac{1}{2}-\frac{1}{2}\cos(2\omega_s t-2\psi)\right)+2n_c(t)n_s(t)\left(\frac{1}{2}\sin(2\omega_s t-2\psi)\right)$$

$$x_Q^2(t) = n_c^2(t)\left(\frac{1}{2}-\frac{1}{2}\cos(2\omega_s t-2\psi)\right) +$$
$$n_s^2(t)\left(\frac{1}{2}+\frac{1}{2}\cos(2\omega_s t-2\psi)\right)-2n_c(t)n_s(t)\left(\frac{1}{2}\sin(2\omega_s t-2\psi)\right)$$

$$x_I^2(t)y_I(t) = \frac{A}{4}(n_c^2(t)-n_s^2(t))\cos(\theta+\psi)-\frac{A}{2}n_c(t)n_s(t)\sin(\theta+\psi)$$

$$x_Q^2(t)y_Q(t) = \frac{A}{4}(n_c^2(t)-n_s^2(t))\sin(\theta+\psi)+\frac{A}{2}n_c(t)n_s(t)\cos(\theta+\psi)$$

Note that the same results are achieved as for the main path. Therefore, we can perform IM3 cancellation in the digital domain because the same products fall on the main path I/Q signals as on the alternate path I/Q signals. However, for this result to work out, we needed to retain both the signal sets $\{x_I(t), y_I(t)\}$ and $\{x_Q(t), y_Q(t)\}$. To accomplish this, one multirate filter bank input must have been downconverted by a sine wave, while the other input must have been downconverted by a cosine wave.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

We claim:

1. A RF section of a receiver for receiving quadrature modulated RF signals comprising:
   a) a first RF circuit configured to receive a RF signal received at a first RF signal input terminal, configured to down convert and digitize said received RF signal and configured to provide a first set of digitized down-converted I and Q signals at a first set of output terminals;
   b) a second RF circuit configured to receive said RF signal, said second RF circuit comprising an analog nonlinear term generator, said analog nonlinear term generator configured to provide third order intermodulation interference (IM3) products of said RF signal while attenuating the portions of said RF signal which are not IM3 products, said second RF circuit configured to provide a second set of digitized down-converted I and Q signals at a second set of output terminals, said second RF circuit comprising a first pair of differential MOSFETs in said analog nonlinear term generator, said first pair of differential MOSFETs having a first single ended output, said first single ended output coupled to a first gate of a second pair of differential MOSFETs, which in turn are coupled to a multiplier cell having two outputs coupled to said second set of output terminals; and
   c) an adaptive filter configured to receive said I and Q signals from said first RF circuit as I and Q signals containing interfering IM3 products, and configured to receive said I and Q signals from the second RF circuit containing compensatory IM3 products of unknown magnitude and phase with respect to said I and Q signals from said first RF section, said adaptive filter configured to provide I and Q signals with attenuated IM3 products compared to said I and Q signals at said first set of output terminals.

2. The RF section of claim 1 wherein the gates of a third pair of differential MOSFETs in said analog nonlinear term generator are configured to receive a common mode signal, said third pair of differential MOSFETs having a second single ended output, said second single ended output coupled to a second gate of said second pair of differential MOSFETs.

3. The RF section of claim 2 wherein said second pair of differential MOSFETs is coupled through an amplifier to said multiplier cell.

4. The RF section of claim 1 wherein said adaptive filter is a modified normalized least mean squares (NLMS) filter.

5. The RF section of claim 4 wherein said NLMS filter has symmetric banks of taps and delay circuits around a central summing node coupled to said delay circuits which, in turn, is coupled to said I and Q signals with attenuated IM3 products with an intervening delay circuit.

6. A RF section of a receiver for receiving quadrature modulated RF signals comprising:
   a) a first RF circuit configured to receive a RF signal received at a first RF signal input terminal, configured to down convert and digitize said received RF signal and configured to provide a first set of digitized down-converted I and Q signals at a first set of output terminals;
   b) a second RF circuit configured to receive said RF signal, said second RF circuit comprising an analog nonlinear term generator, said analog nonlinear term generator configured to provide third order intermodulation interference (IM3) products of said RF signal while attenuating the portions of said RF signal which are not IM3 products, said second RF circuit configured to provide a second set of digitized down-converted I and Q signals at a second set of output terminals; and
   c) a modified normalized least mean squares (NLMS) filter configured to receive said I and Q signals from said first RF circuit as I and Q signals containing interfering IM3 products, and configured to receive said I and Q signals from the second RF circuit containing compensatory IM3 products of unknown magnitude and phase with respect to said I and Q signals from said first RF section, said NLMS filter has symmetric banks of taps and delay circuits around a central summing node coupled to said delay circuits which, in turn, is coupled to said I and Q signals with attenuated IM3 products with an intervening delay circuit, said NLMS filter configured to provide I and Q signals with attenuated IM3 products compared to said I and Q signals at said first set of output terminals.

7. The RF section of claim 6 wherein said second RF circuit comprises a first pair of differential MOSFETs in said analog nonlinear term generator, said first pair of differential MOSFETs having a first single ended output, said first single ended output coupled to a first gate of a second pair of differential MOSFETs, which in turn are coupled to a multiplier cell having two outputs coupled to said second set of output terminals.

8. The RF section of claim 7 wherein the gates of a third pair of differential MOSFETs in said analog nonlinear term generator are configured to receive a common mode signal, said third pair of differential MOSFETs having a second single ended output, said second single ended output coupled to a second gate of said second pair of differential MOSFETs.

9. The RF section of claim 8 wherein said second pair of differential MOSFETs is coupled through an amplifier to said multiplier cell.

* * * * *